United States Patent
Helmstetter et al.

(10) Patent No.: US 6,607,452 B2
(45) Date of Patent: Aug. 19, 2003

(54) HIGH MOMENT OF INERTIA COMPOSITE GOLF CLUB HEAD

(75) Inventors: Richard C. Helmstetter, Rancho Santa Fe, CA (US); Herbert Reyes, Laguna Niguel, CA (US); James M. Murphy, Oceanside, CA (US); Matthew T. Cackett, San Diego, CA (US); Pin Fan, Carlsbad, CA (US)

(73) Assignee: Callaway Golf Company, Carlsbad, CA (US)

( * ) Notice: Subject to any disclaimer, the term of this patent is extended or adjusted under 35 U.S.C. 154(b) by 182 days.

(21) Appl. No.: 09/796,951

(22) Filed: Feb. 27, 2001

(65) Prior Publication Data

US 2002/0006836 A1 Jan. 17, 2002

Related U.S. Application Data

(63) Continuation-in-part of application No. 09/474,688, filed on Dec. 29, 1999, which is a continuation-in-part of application No. 08/958,723, filed on Oct. 23, 1997, now Pat. No. 6,010,411.

(51) Int. Cl.[7] .............................................. A63B 53/04
(52) U.S. Cl. ...................................................... 473/345
(58) Field of Search ................................ 473/348, 347, 473/345, 346, 349, 324

(56) References Cited

U.S. PATENT DOCUMENTS

| | | | | |
|---|---|---|---|---|
| 3,941,390 A | * | 3/1976 | Hussey | |
| 4,575,447 A | * | 3/1986 | Hariguchi | |
| 5,485,998 A | * | 1/1996 | Kobayashi | |
| 5,971,867 A | * | 10/1999 | Galy | |
| 6,102,813 A | | 8/2000 | Dill | |
| 6,123,627 A | * | 9/2000 | Antonius | |

FOREIGN PATENT DOCUMENTS

JP                157651 A    *   6/2000

* cited by examiner

Primary Examiner—Stephen Blau
(74) Attorney, Agent, or Firm—Michael A. Catania

(57) ABSTRACT

A high moment of inertia golf club head composed of a composite material and having a weight strip in a ribbon section is disclosed herein. The weight strip may be composed of copper, tungsten or a similar metal. The moment of inertia, $I_{zz}$, of the golf club head about a vertical axis Z through the center of gravity ranges from 2800 g-cm$^2$ to 5000 g-cm$^2$, and a moment of inertia, $I_{yy}$, about a horizontal axis Y through the center of gravity of the golf club head ranges from 1900 g-cm$^2$ to 2500 g-cm$^2$. The golf club head is preferably composed of plies of pre-peg sheets. The volume of the composite golf club head varies from 300 cm$^3$ to 600 cm$^3$.

6 Claims, 23 Drawing Sheets

De-lofting Force

De-lofting Moment

De-lofting Rotation
Back Spin

Lofting Force

Lofting Moment

Lofting Rotation
Top Spin

Opening Force
+Fx

Opening Moment

Izz

Opening Rotation

Draw Spin

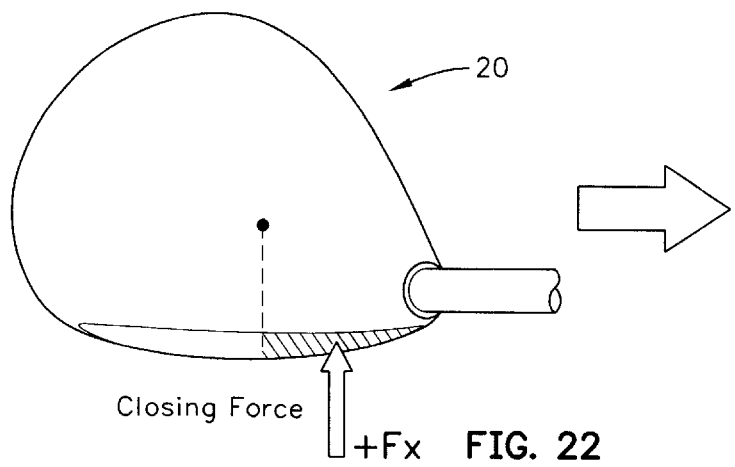
Closing Force  +Fx   FIG. 22
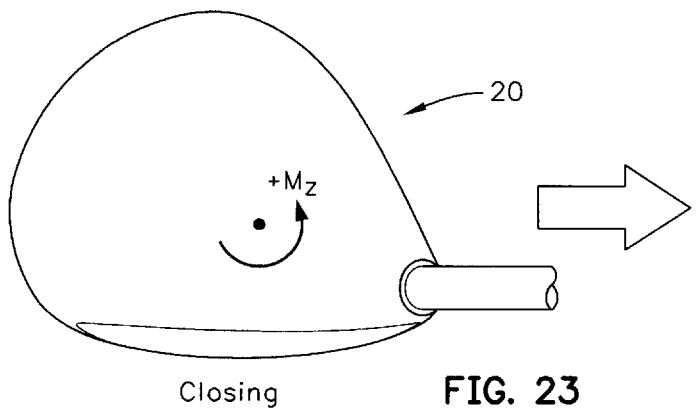
Closing   FIG. 23
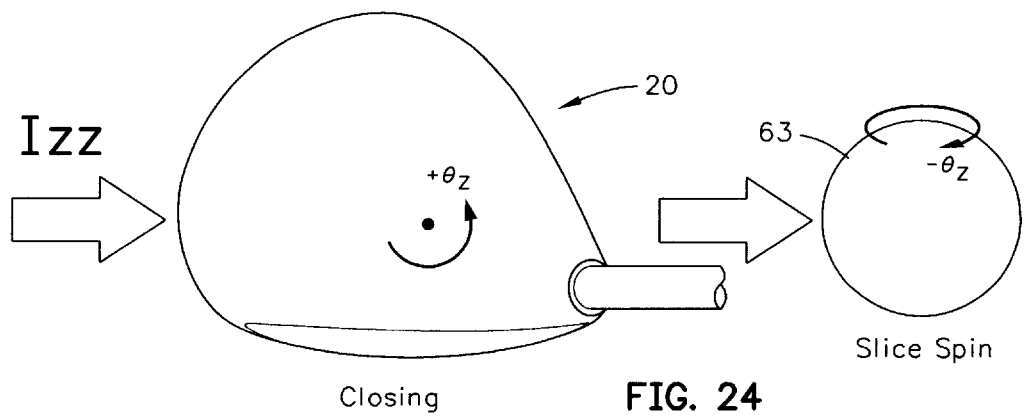
Izz   Closing   FIG. 24   Slice Spin Change in Distance (yds)
per 100 erc increase in Izz Change in Lateral Apex (ft)
per 100 erc increase in Izz Change in Distance (yds)
per 100 erc increase in Iyy

HIGH MOMENT OF INERTIA COMPOSITE GOLF CLUB HEAD

CROSS REFERENCES TO RELATED APPLICATIONS

This application is a continuation-in-part application of co-pending U.S. patent application Ser. No. 09/474,688, filed on Dec. 29, 1999, which is a continuation-in-part application of U.S. patent application Ser. No. 08/958,723, filed on Oct. 23, 1997, and now U.S. Pat. No. 6,010,411, both of which are hereby incorporated by reference in their entirety.

BACKGROUND OF THE INVENTION

1. Field of the Invention

The present invention relates to a golf club head. More specifically, the present invention relates to a golf club head composed of a composite material.

2. Description of the Related Art

In recent years, substantial attention has been directed toward the development of golf club heads having desired weight characteristics and, in particular, toward the development of golf club heads having a desired center of gravity location. For example, a designer may want to locate the center of gravity of a golf club head in a predetermined or preferred position relative to the face or "sweet spot" of the golf club head to provide greater distance.

Because conventional golf club heads are typically made from metal alloys or other materials having a substantially homogeneous density, the weight characteristics of such golf club heads are typically defined by their overall shape. Thus, to alter the location of the center of gravity of a golf club head, it is often necessary to redesign the shape or configuration of the golf club head. However, this may adversely impact other desired characteristics of the golf club head.

The design process may be further complicated where golf club heads are manufactured using composite materials (typically carbon reinforced plastic). Because composite materials are typically less dense than metal and other conventional materials, composite golf club heads generally require additional weighting to achieve desired swing weights for finished golf clubs.

The Rules of Golf, established and interpreted by the United States Golf Association ("USGA") and The Royal and Ancient Golf Club of Saint Andrews, set forth certain requirements for a golf club head. The requirements for a golf club head are found in Rule 4 and Appendix II. A complete description of the Rules of Golf are available on the USGA web page at www.usga.org. Although the Rules of Golf do not expressly state specific parameters for a golf club, Rule 4-1d states that the club head shall be generally plain in shape, and all parts shall be rigid, structural in nature and functional.

Many solutions have been proposed to adjust and/or increase the weight of composite golf club heads. For example, a weighting agent or material is often introduced into a cavity within a golf club head subsequent to manufacture. In the case of wood type golf club heads, the cavity may be enclosed by the face, sides, sole and crown of the golf club head. However, it is not uncommon for cavities also to be formed, for example, in the sole, heel or toe regions of iron or putter type golf club heads. Because of limited access to the cavities, however, such weighting materials may not be placed as precisely as desired and may not provide the ability to adjust the weight of the golf club heads, or the location of the center of gravity of the golf club heads, very precisely. Furthermore, such materials may dry and separate from the walls of the golf club heads during use, adversely affecting the weight of the golf club heads and possibly creating a distracting sound or feel when the golf clubs are swung.

Alternatively, a composite golf club head may be provided with a solid or foam core. However, the use of solid or foam core materials has been shown generally to be ineffective for adjusting the location of the center of gravity and moments of inertia of golf club heads. The reason for this is that solid or foam core materials generally have a uniform density, making it difficult to adjust the location of the center of gravity or moments of inertia of the golf club head without simultaneously altering the shape or configuration of the golf club head. Additionally, such materials may result in voids within the golf club head.

For a golf club head including composite material, higher density layers of composite fiber may be provided in the wall of the golf club head to increase its weight. However, such changes in the layers of composite material may affect the structural characteristics of the golf club head.

In view of the foregoing, there appears to be a substantial need for improved methods of manufacturing composite golf club heads and, in particular, for methods that allow for more effective adjustment of the weight characteristics of golf club heads without substantially affecting the structural characteristics of the golf club heads.

There also appears to be a need for improved composite golf club heads manufactured in accordance with such methods.

BRIEF SUMMARY OF THE INVENTION

The present invention provides a high moment of inertia composite golf club head that provides greater performance than traditional composite golf club heads. The golf club head of the present invention is able to accomplish this by providing a multiple of weight components in the sole and ribbon(s) of the golf club head.

One aspect of the present invention is a golf club head including a body with a weight strip. The body has a hollow interior and is composed of a composite material. The body has a face, a sole, a crown, a ribbon juxtaposed by the sole and the crown, a heel end and a toe end. The weight strip is composed of a material having a density greater than the composite material, and is disposed in the ribbon. The body has a volume greater than 300 cm$^3$ and has a moment of inertia, Izz, greater than 3000 g-cm$^2$ about a vertical axis, Z, through the center of gravity of the golf club head.

The body may be composed of a plurality of layers of plies of pre-preg composite material. The weight strip may be juxtaposed between layers of the plurality of layers of plies of pre-preg composite material.

Another aspect of the present invention is a golf club head including a body and a plurality of weight strips. The body has a hollow interior and is composed of a composite material. The body has a face, a sole, a crown, a ribbon juxtaposed by the sole and the crown, a heel end and a toe end. Each of the plurality of weight strips is composed of a material having a density greater than the composite material, and each of the plurality of weight strips is disposed in the ribbon and or the sole. The body has a volume greater than 300 cm$^3$, a moment of inertia, Izz, about a vertical axis, Z, through the center of gravity of the golf club head that ranges from 2800 g-cm$^2$ to 5000 g-cm$^2$, and a moment of inertia, Iyy, about a horizontal axis, Y, through the center of gravity of the golf club head that ranges from 1800 g-cm² to 2500 g-cm².

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 22 is an illustration of a closing force from center-heel strike of a golf ball against the striking plate of a golf club of the present invention.

FIG. 23 is an illustration of a closing moment about the Z axis through the center of gravity from a center-heel strike of a golf ball against the striking plate of a golf club of the present invention.

FIG. 24 is an illustration of a closing rotation about the Z axis through the center of gravity from a low-center strike of a golf ball against the striking plate a golf club of the present invention, and the slice spin produced on the golf ball.

DETAILED DESCRIPTION OF THE INVENTION

Figure 1:
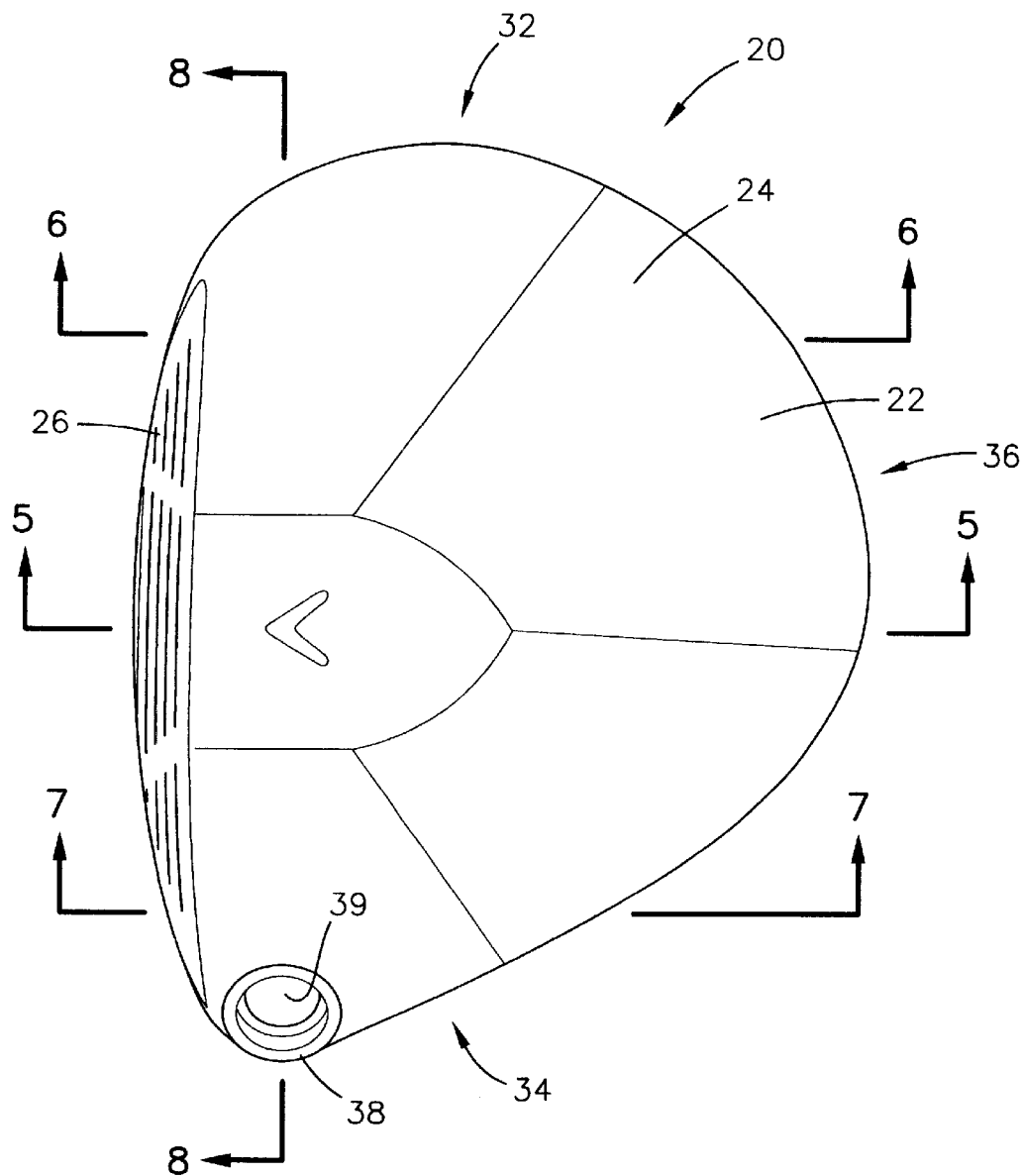
FIG. 1 is a top plan view of a golf club head of the present invention.
Figure 2:
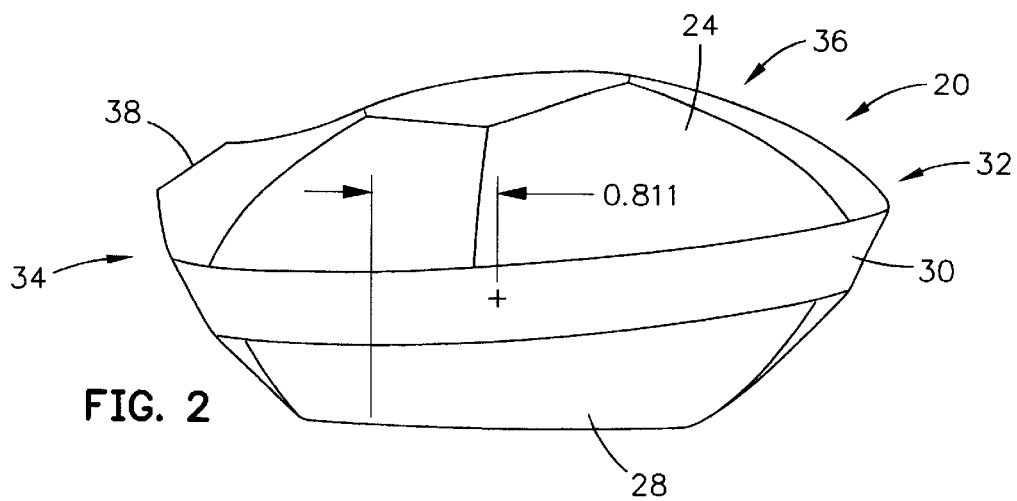
FIG. 2 is a rear view of the golf club head of FIG. 1.
Figure 3:
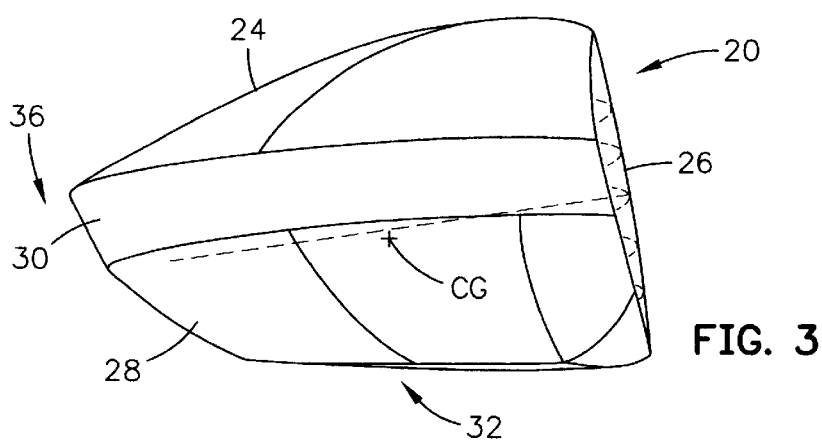
FIG. 3 is a toe end view of the golf club head of FIG. 1.
Figure 4:
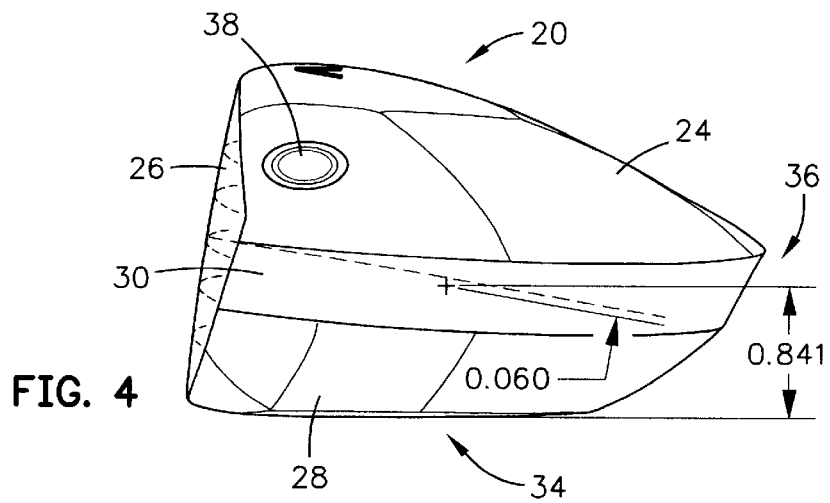
FIG. 4 is a heel end view of the golf club head of FIG. 1.
Figure 5:
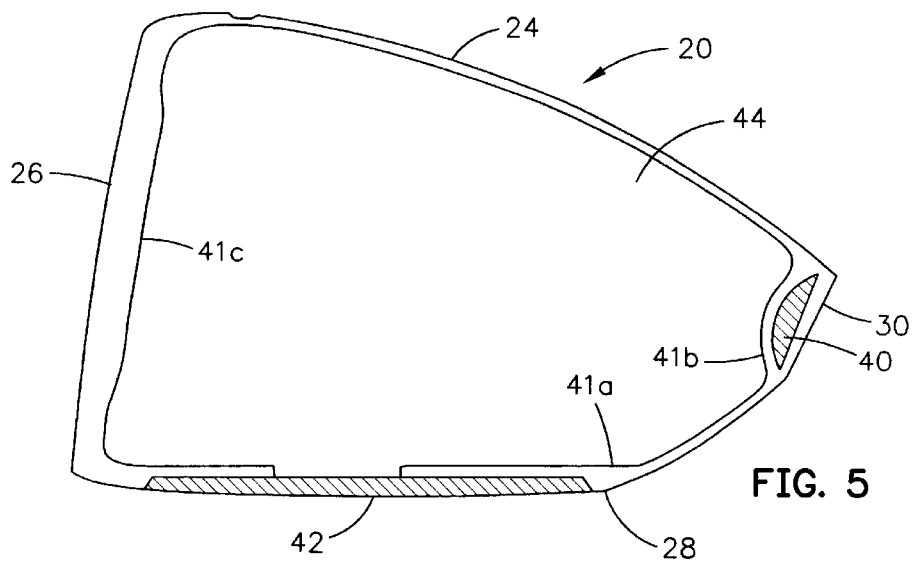
FIG. 5 is a cross-sectional view of the golf club head of FIG. 1 along line 5—5.
Figure 6:
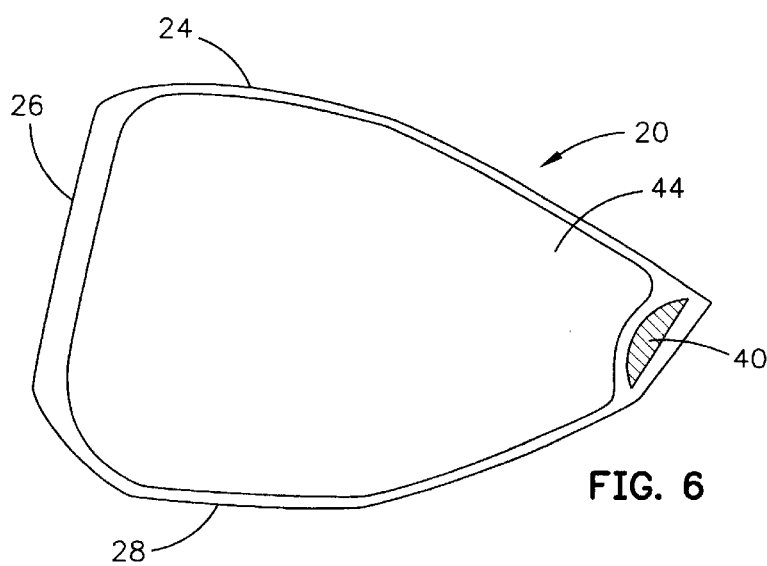
FIG. 6 is a cross-sectional view of the golf club head of FIG. 1 along line 6—6.
Figure 7:
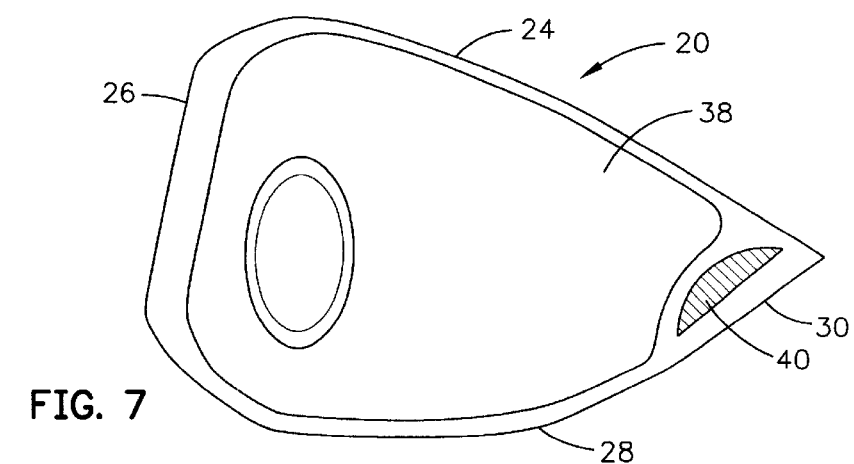
FIG. 7 is a cross-sectional view of the golf club head of FIG. 1 along line 7—7.

As shown in FIGS. 1–4, a golf club head of the present invention is generally designated 20. The club head 20 may be a fairway wood or a driver. The club head 20 has a body 22 that is generally composed of a composite material such as plies of carbon pre-preg (pre-impregnated) sheets, or a similar non-metallic material such as an injectable thermoplastic material. The body 22 has a crown 24, a face 26, a sole 28 and a ribbon 30 juxtaposed by the sole 28 and the crown 24. The ribbon 30 generally extends from a toe end 32 to a heel end 34. The ribbon 30 generally begins at one end of the face 26 and ends at an opposite end of the face 26. A rear 36 of the body 22 is opposite the face 26 and is defined by portions of the ribbon 30, the crown 24 and the sole 28. The ribbon 30 increases the volume of the club head 20 and also assists in creating a club head 20 with a higher moment of inertia as described in greater detail below. Also, at the heel end 34 of the club head 20 is a hosel 38 with a shaft opening 39 for insertion of a shaft therein.

As shown in FIGS. 5–8, the club head 20 has a weight strip 40 disposed in the ribbon 30 of the club head 20. The weight strip 40 is preferably embedded within layers of the plies of pre-peg 41a–b as described in greater detail below. A sole plate 42 is attached to the sole 28 of the body 22.

Figure 8:
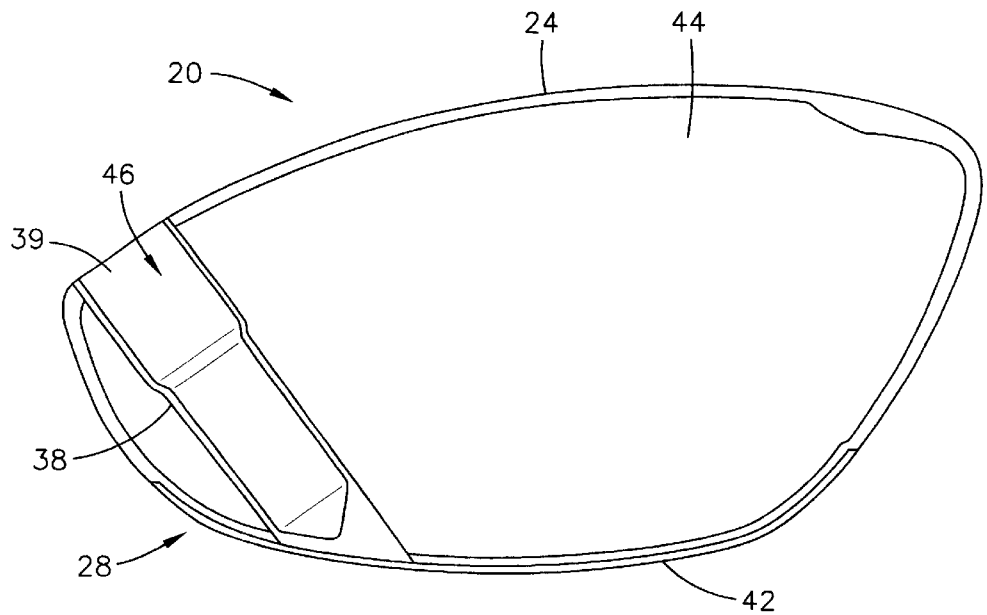
FIG. 8 is a cross-sectional view of the golf club head of FIG. 1 along line 8—8.

As shown in FIG. 8, the sole plate 42 is attached to the exterior surface of the sole 28, and a hosel 38 is positioned within the hollow interior 44 of the club head 20. The sole plate is preferably composed of a metal such as aluminum, titanium or stainless steel, and is attached through use of an adhesive, bound during processing, or fixed in some other conventional manner. The sole plate 42 weighs approximately 5 grams to 25 grams. The hosel 38 is preferably composed of a metal such as stainless steel. The hosel 38 preferably weighs 5 to 20 grams, and is attached through use of an adhesive, bound during processing, or fixed in some other conventional manner within the hollow interior 44. Preferably, the hollow interior 44 is unfilled, however, the light weight of the composite body 22 allows for numerous manipulations in placement of weight, foam, sound enhancing devices and the like within the hollow interior 44.

Figure 8A:
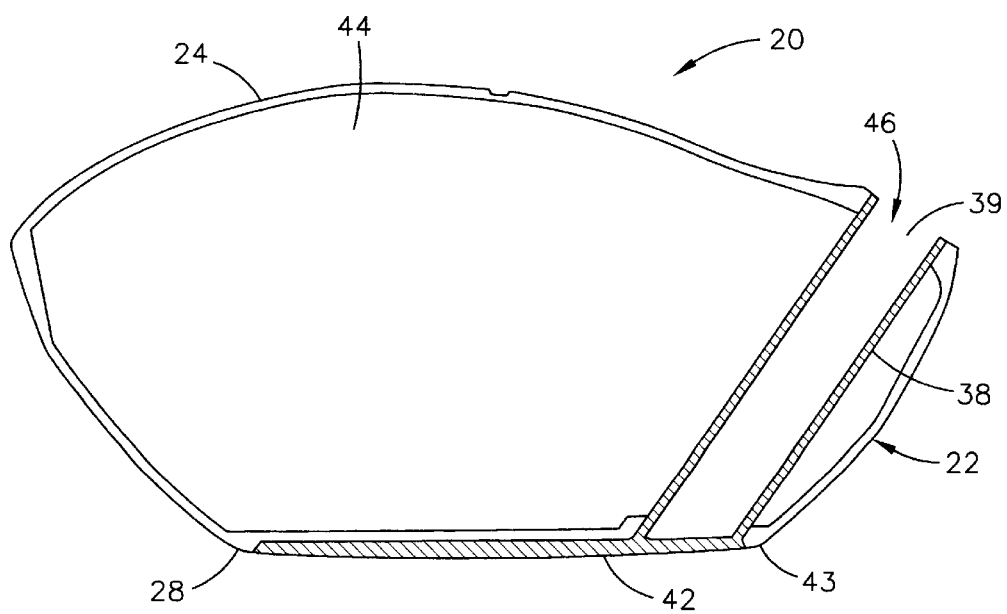
FIG. 8A is a cross-sectional view of the golf club head of an alternative embodiment with a sole plate having an attached hosel.

As shown in FIG. 8A, sole plate 42 may be integral with the hosel 38 forming a sole plate hosel integral piece 43 that is incorporated into the club head 20. The hosel 38 lies within the hollow interior 44 of the club head 20. The sole plate hosel integral piece 43 is inserted into a sole cavity that is shaped to accommodate the sole plate 42. The hosel 38 is inserted through a hosel aperture 50 to connect with the shaft opening 39 for placement of a shaft therethrough. A sole plate aperture 52 allows for access to the hollow interior 44 through the sole 28 which is utilized for fabrication of club head 20 as described below. In one embodiment, the sole plate hosel integral piece 43 is composed of a stainless steel material. The sole plate hosel integral piece 43 is further described in U.S. Pat. No. 6,244,976, filed on Dec. 29, 1999, and entitled Integral Sole Plate And Hosel For A Golf Club Head, which is hereby incorporated in its entirety.

The weight strips 40 are preferably composed of a film loaded with a high density metal (like tungsten), or a metal material such as copper, tungsten, steel, aluminum, tin, silver, gold, platinum, or the like. The weight strip 40 may be a thermoplastic material filled with a metal to an appropriate density, and the metal filler may be tungsten, brass, copper, steel, tin, or the like. Further, the weight strip 40 may be a single piece of metal such as tungsten, brass, copper, steel, tin, or the like. The weight strip 40 has a density greater than the composite material of the body 22. Each weight strip 40 individually weighs approximately 3 grams to 35 grams, and more preferably from 10 grams to 30 grams. The total combined weight of all of the weight strips 40 is approximately 50 grams to 70 grams, and most preferably 60 grams.

Preferably, the weight strip 40 extends from approximately the heel end 34 of the face 26 through the rear 36 to the toe end 32 of the face 26. However, the weight strip 40 may only extend along the rear 36 of the ribbon 30, the heel end 34 of the ribbon 30, the toe end 32 of the ribbon 30, or any combination thereof. Preferably, the weight strip 40 occupies the majority of area of the ribbon 30. However, the weight strip 40 may only occupy a small area of the ribbon 30.

Figure 9:
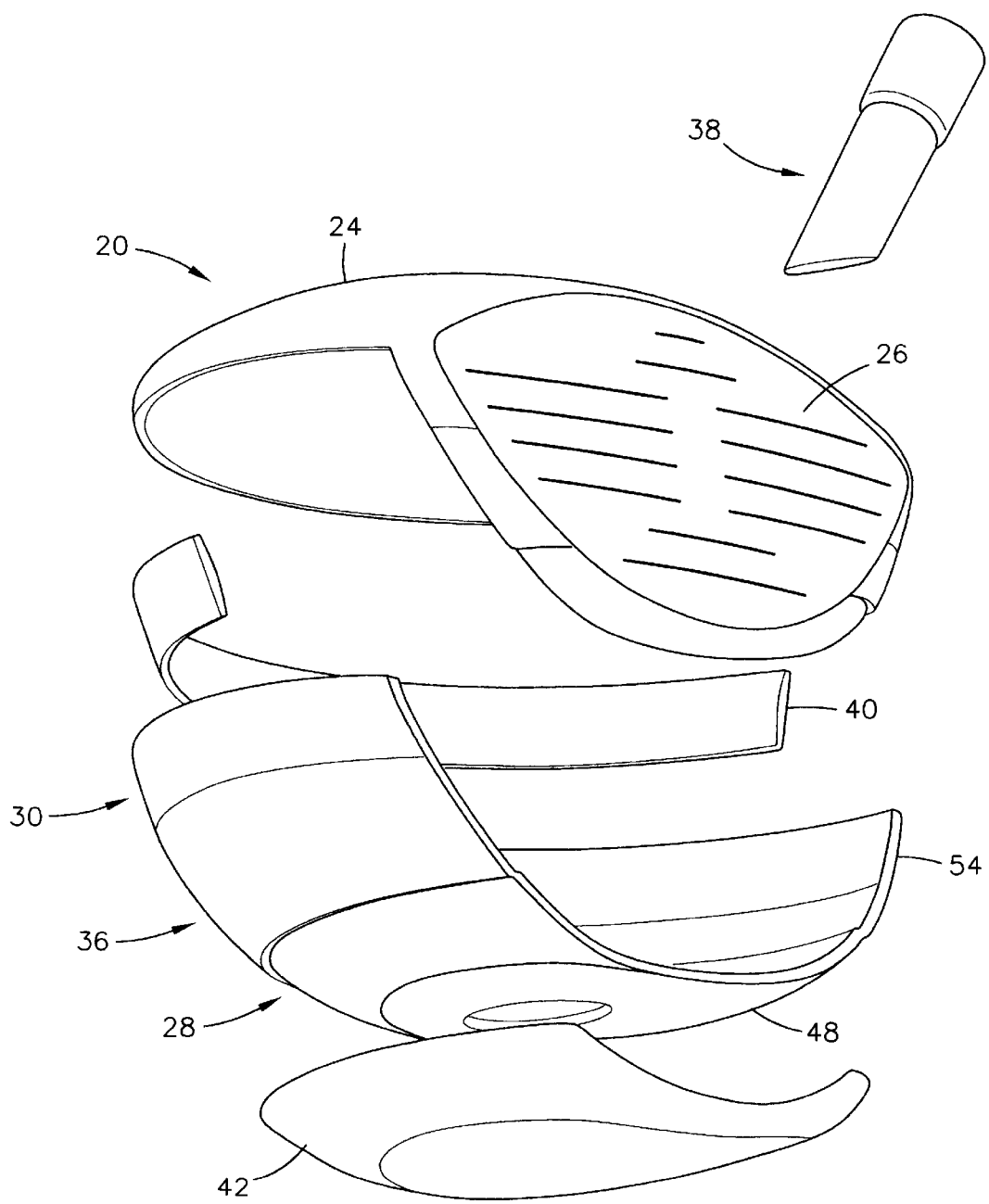
FIG. 9 is an exploded view of the golf club head of the present invention.

In preferred embodiment, as shown in FIG. 9, the weight strip 40 is a single piece co-cured to the ribbon 30. However, the weight strip 40 may be two, three, four, or more pieces co-cured to the ribbon and extending along a portion of the ribbon 30. The multiple piece weight strip 40 may be partitioned horizontally or vertically.

Figure 9A:
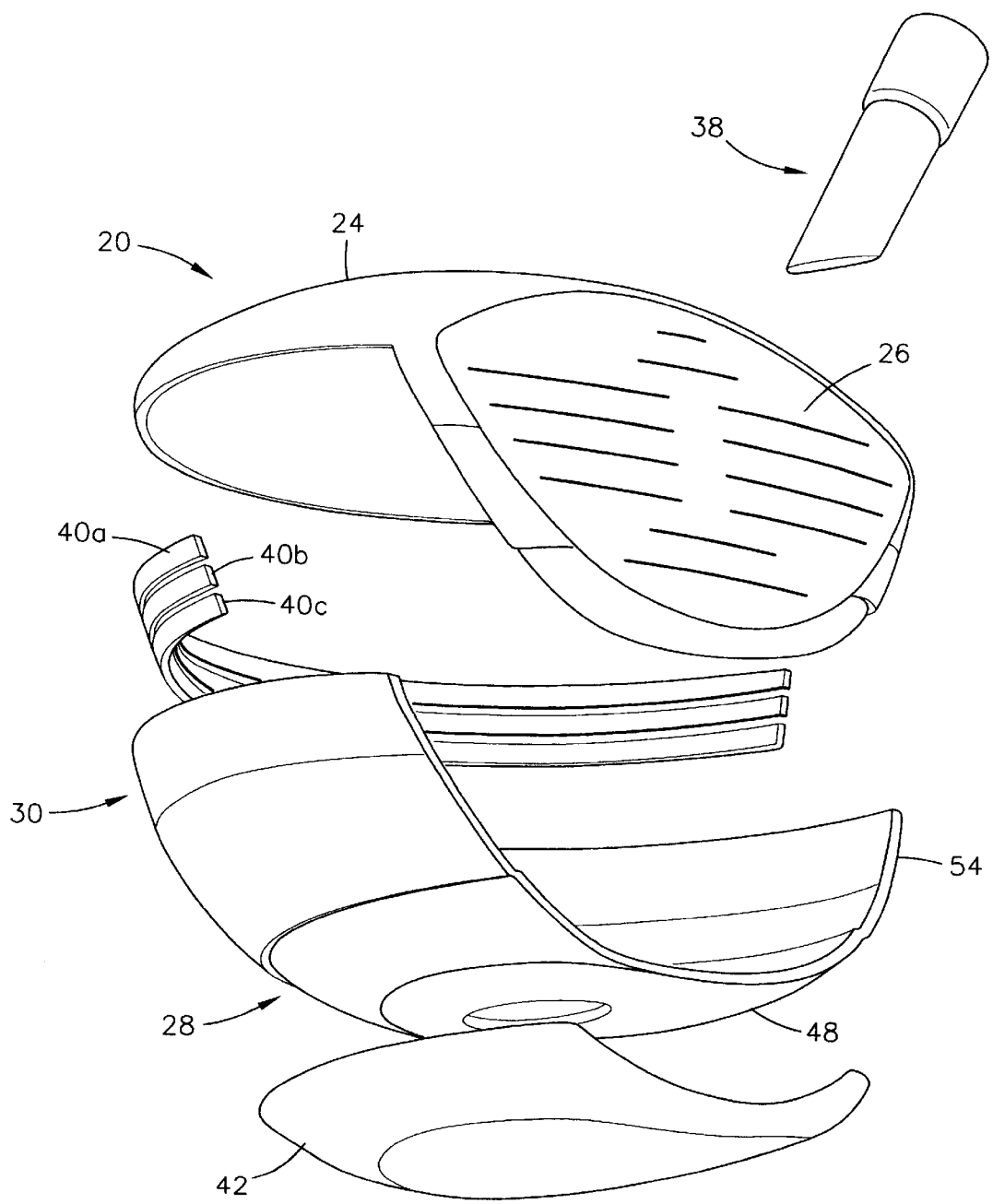
FIG. 9A is an exploded view of another alternative embodiment of the golf club head of the present invention.
Figure 9B:
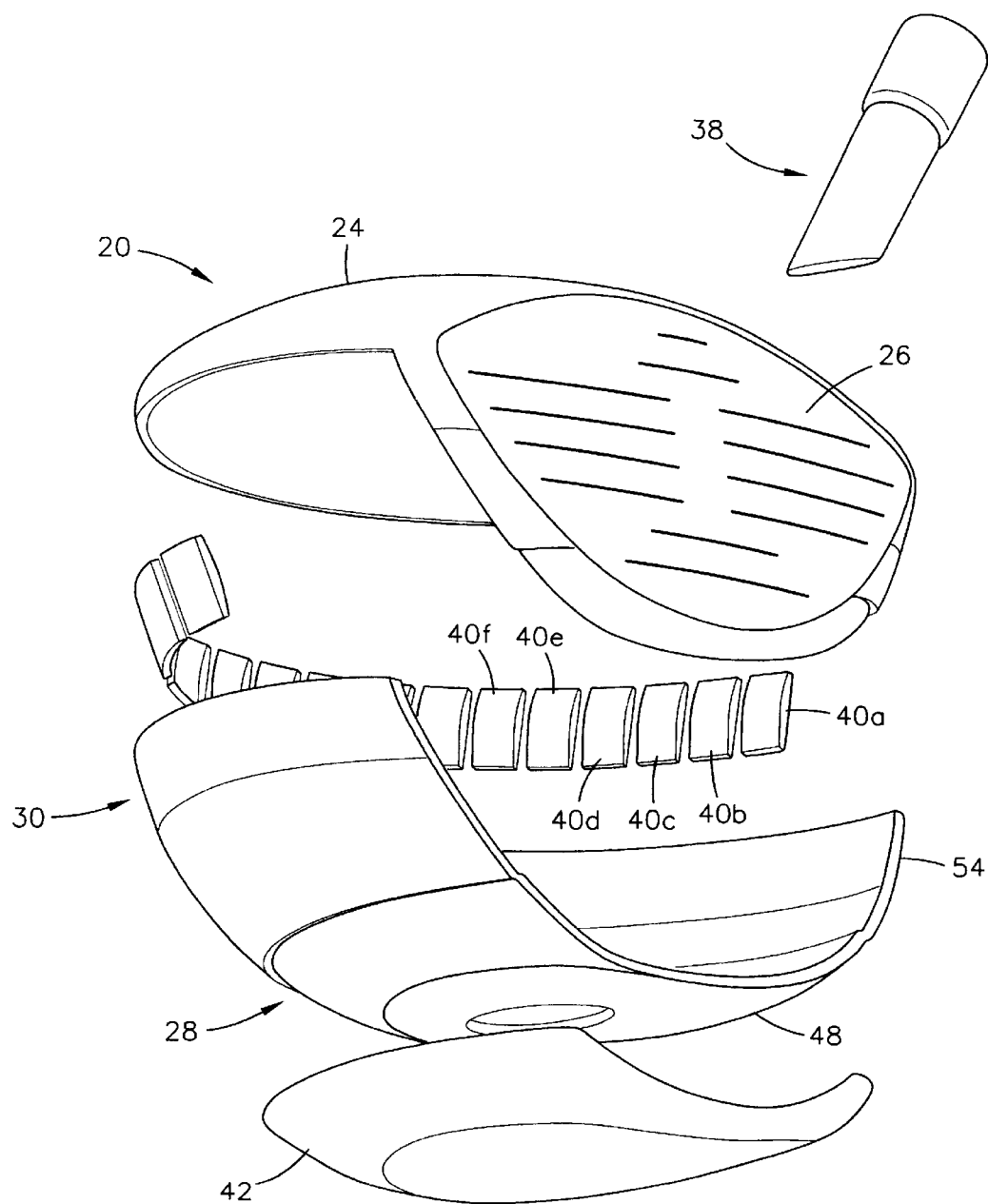
FIG. 9B is an exploded view of yet another alternative embodiment of the golf club head of the present invention.
Figure 9C:
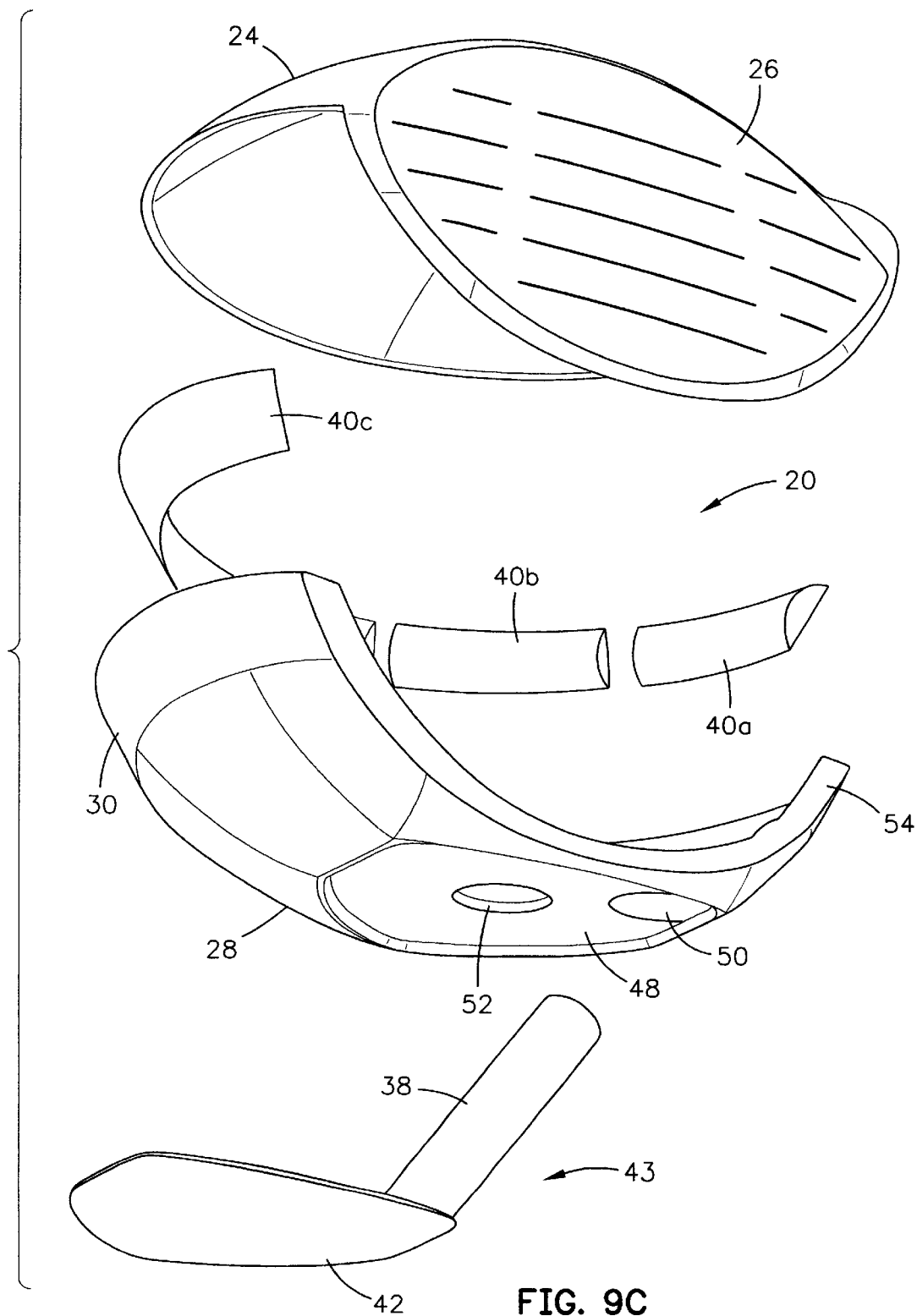
FIG. 9C is an exploded view of an alternative embodiment of the golf club head of the present invention.

In an alternative embodiment as shown in FIG. 9A, three separate weight strips 40a–c are parallel to each other and extend along substantially the entire length of the ribbon 30. In yet another alternative embodiment shown in FIG. 9B, multiple weight strips 40a–j are evenly distributed along the entire length of the ribbon 30. Those skilled in the pertinent art will recognize that numerous variations for the weight strip 40 are possible without departing from the scope and spirit of the present invention. As shown in FIG. 9C, three separate weight strips 40a–c are positioned in the toe end 32 of the ribbon 30, the rear 36 of the ribbon 30, and the heel end 32 of the ribbon 30. The embodiment of FIG. 9C utilizes the sole plate hosel integral piece 43.

As previously stated, the preferred composite material is plies of carbon pre-preg sheets. Plies of pre-preg composite sheets are manufactured by pulling strands of fiber in a parallel motion, preferably carbon or glass fiber, through a resin film and allowing the resin to partially cure or "stage". When the resin is partially staged, the resin holds the fibers together such that the fibers form a malleable sheet with all of the fibers in a specific orientation relative to an edge of the sheet. Exemplary carbon pre-preg fiber sheets may be obtained from Newport Composites of Santa Ana, Calif., Cytec Inc. of Anaheim, Calif., or Hexcel Inc. of Pleasonton, Calif. Alternatively, the layers 41a–c of the composite body 22 may comprise a plurality of plies of composite fiber without any resin, each typically comprising a continuous fiber braid or mat, that are used to make a dry reinforcement preform, as described in U.S. Pat. No. 6,010,411 filed on Oct. 23, 1997, which is hereby incorporated by reference in its entirety.

The composite body 22 may include one or more plies of pre-preg that define structurally the various walls of the golf club head 20. Stated differently, the plies of pre-preg composite sheet are selected and included in the various walls of the golf club head 20 based upon the structural characteristics desired for a finished golf club head. As will be understood by those skilled in the art, the simplified arrangement of plies shown in the figures is merely demonstrative of one configuration that a designer might select. Numerous other configurations may, of course, be utilized depending upon the desired structural characteristics of the golf club head 20. One such configuration is set forth in U.S. Pat. No. 6,248,025, filed on Dec. 29, 1999, entitled Composite Golf Club Head And Manufacturing Method, which is hereby incorporated by reference in its entirety.

Figure 10:
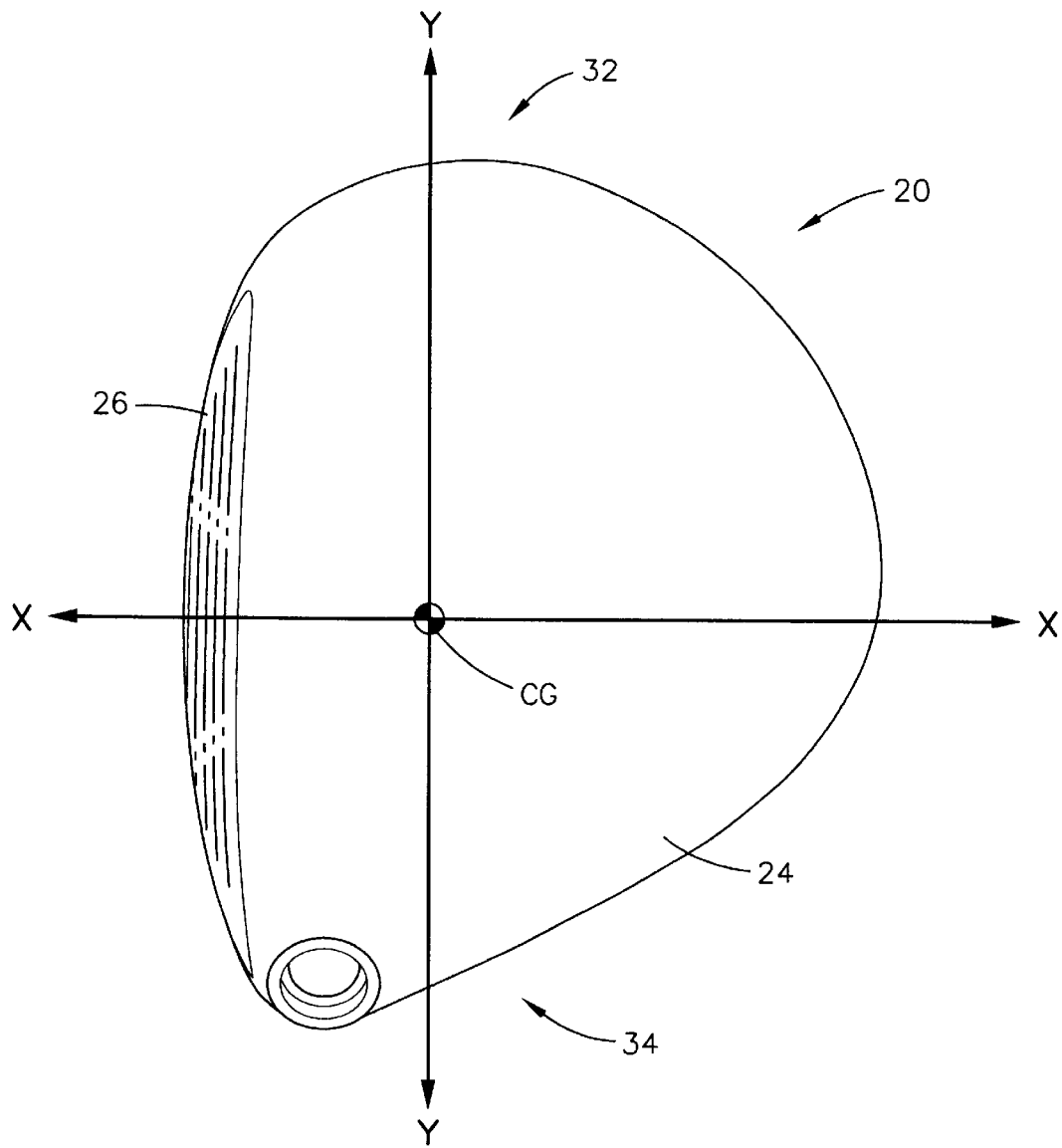
FIG. 10 is a top plan view of a golf club of the present invention illustrating the Y axis and X axis.
Figure 10A:
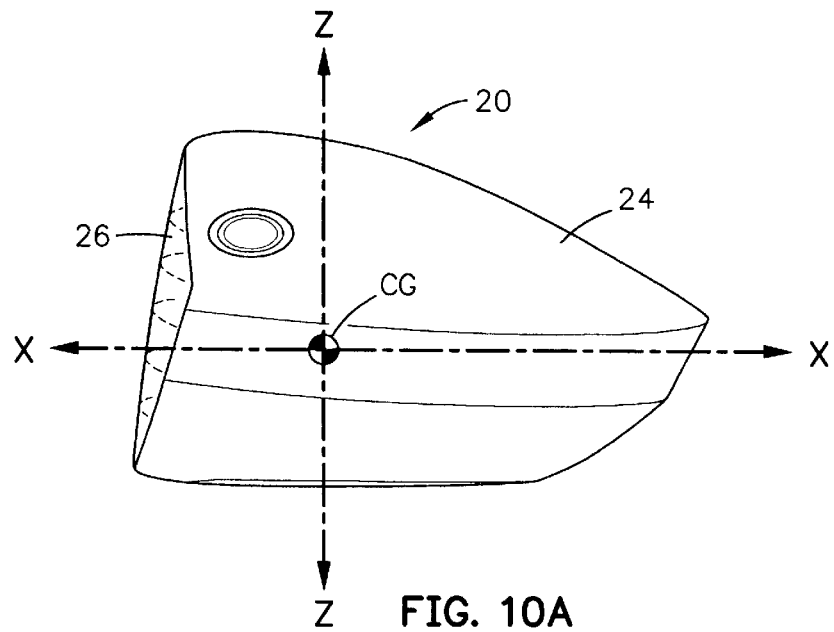
FIG. 10A is a heel side plan view of a golf club of the present invention illustrating the Z axis and X axis.
Figure 10B:
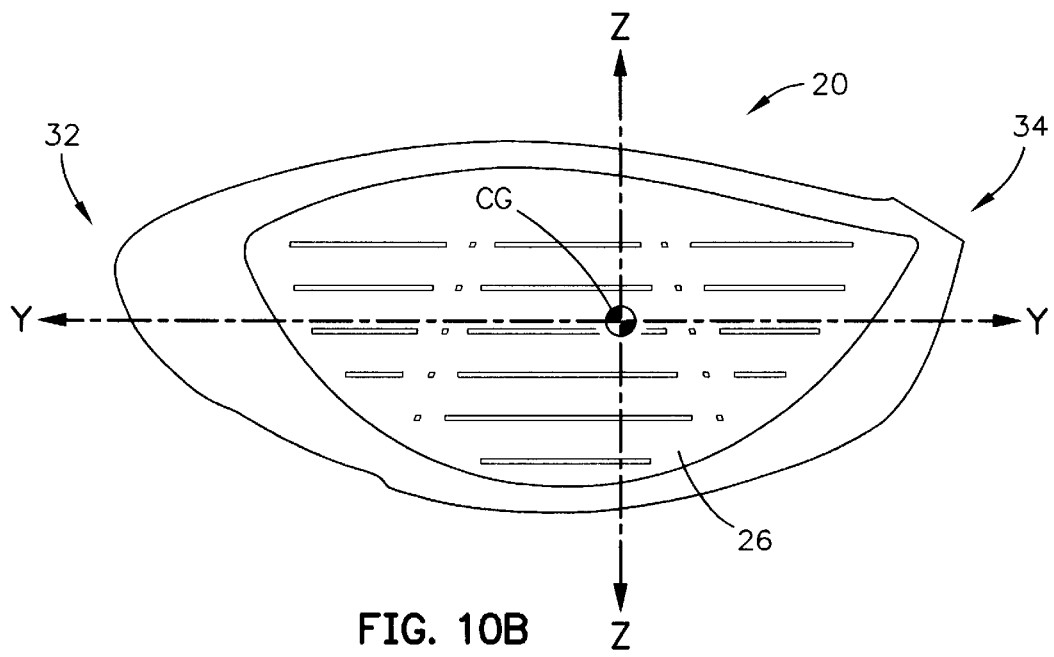
FIG. 10B is a front plan view of a golf club of the present invention illustrating the Z axis and Y axis.

FIGS. 10, 10A and 10B illustrate the axes of inertia through the center of gravity of the golf club head. The axes of inertia are designated X, Y and Z. The X axis extends from the striking plate 26 through the center of gravity, CG, and to the rear of the golf club head 20. The Y axis extends from the heel end 32 of the golf club head 20 through the center of gravity, CG, and to the toe end 34 of the golf club head 20. The Z axis extends from the sole 24 through the center of gravity, CG, and to the crown 28.

As defined in *Golf Club Design, Fitting, Alteration & Repair*, 4th Edition, by Ralph Maltby, the center of gravity, or center of mass, of the golf club head is a point inside of the club head determined by the vertical intersection of two or more points where the club head balances when suspended. A more thorough explanation of this definition of the center of gravity is provided in *Golf Club Design, Fitting, Alteration & Repair*.

Figure 11:
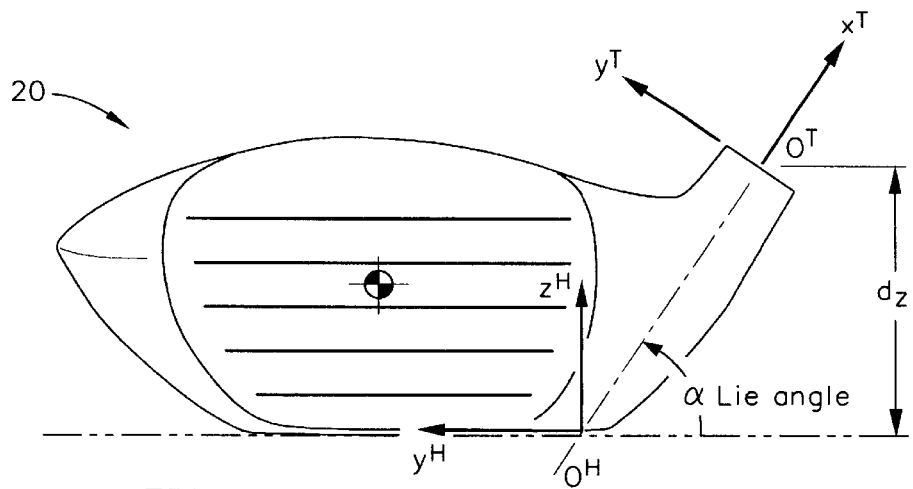
FIG. 11 is a front plan view of a golf club of the present invention illustrating the test frame coordinates $X^T$ and $Y^T$ and transformed head frame coordinates $Y^H$ and $Z^H$.
Figure 11A:
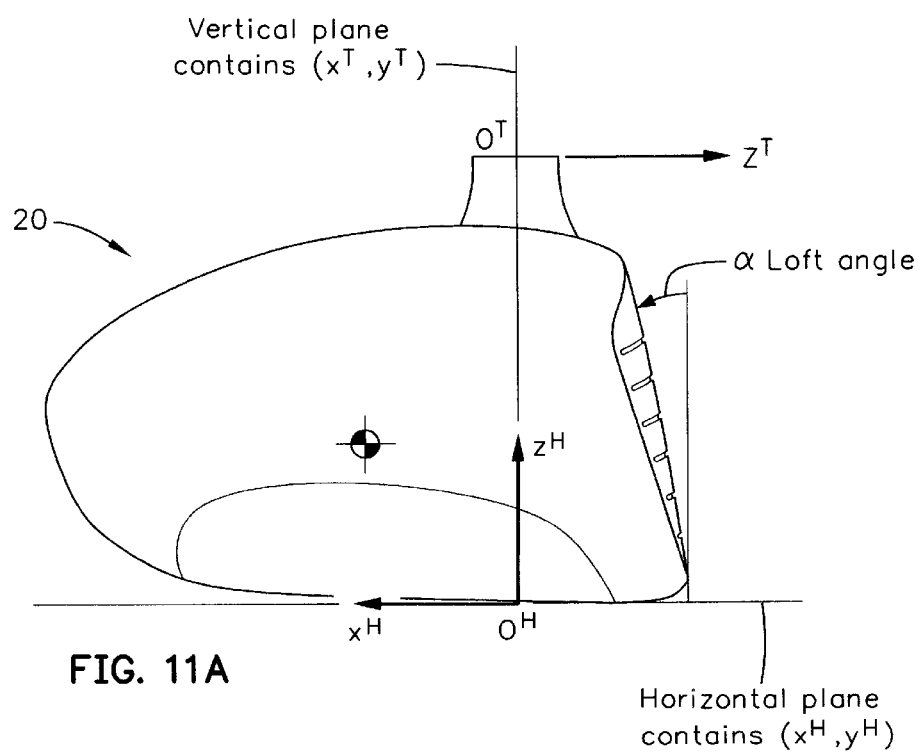
FIG. 11A is a toe end view of the golf club of the present invention illustrating the test frame coordinate $Z^T$ and transformed head frame coordinates $X^H$ and $Z^H$.
Figure 12:
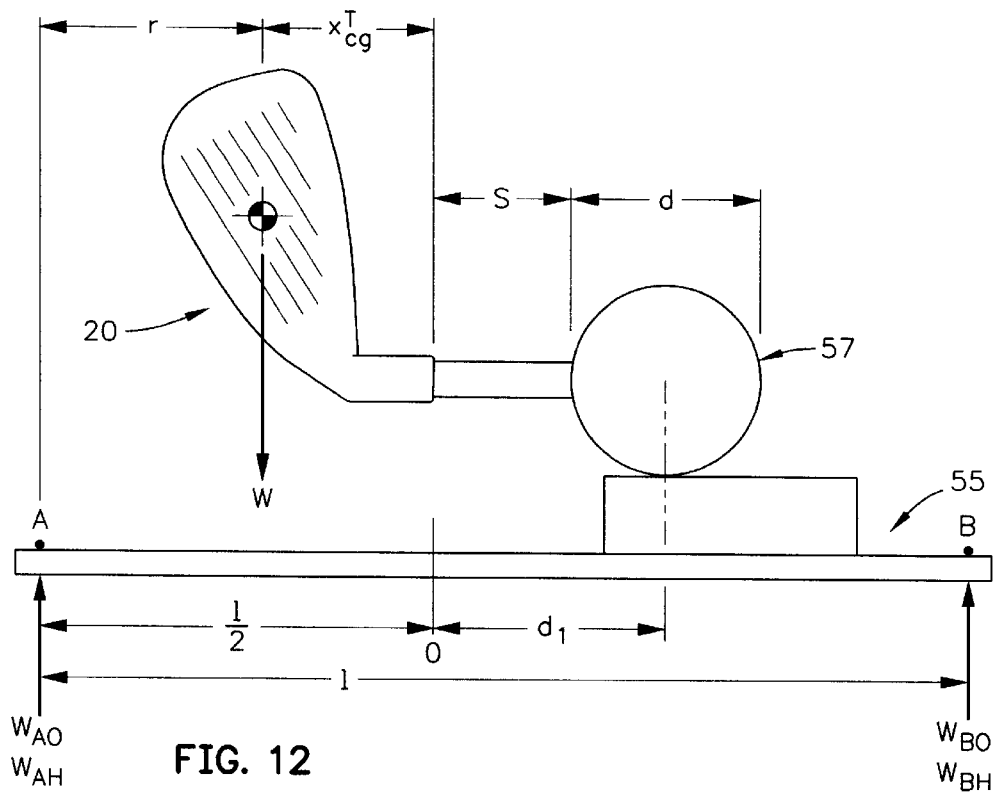
FIG. 12 is an illustration of a center of gravity table for a golf club head of the present invention used to measure the center of gravity along the X axis.
Figure 12A:
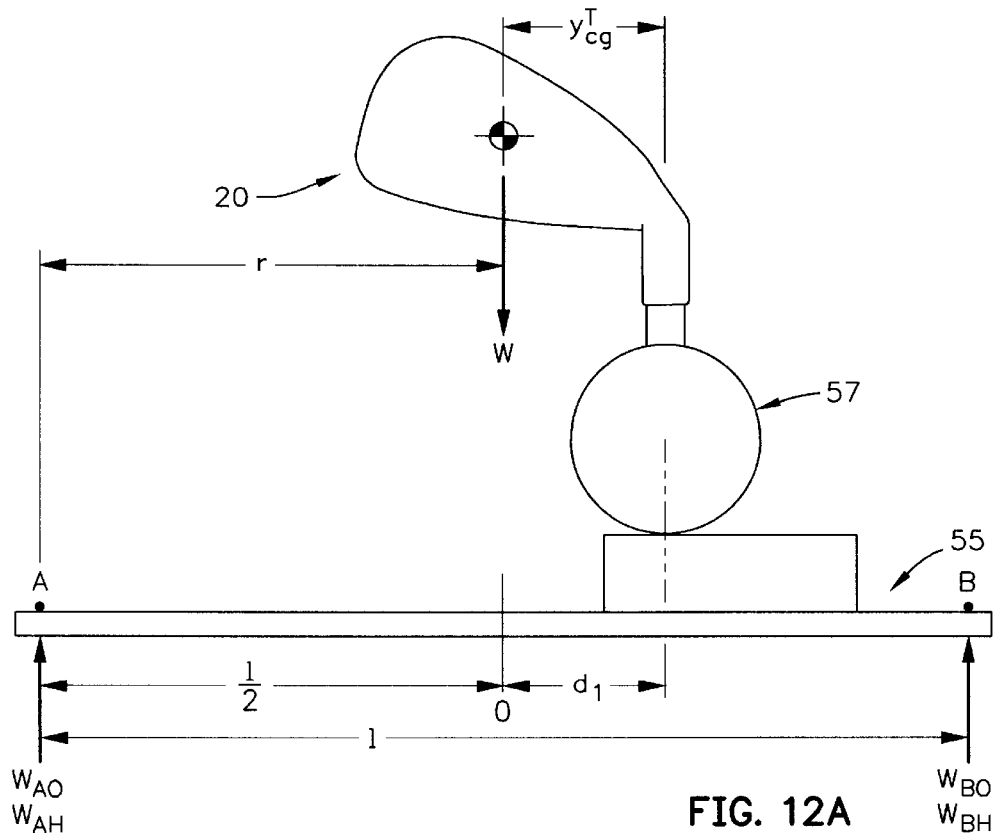
FIG. 12A is an illustration of a center of gravity table for a golf club head of the present invention used to measure the center of gravity along the Y axis.
Figure 12B:
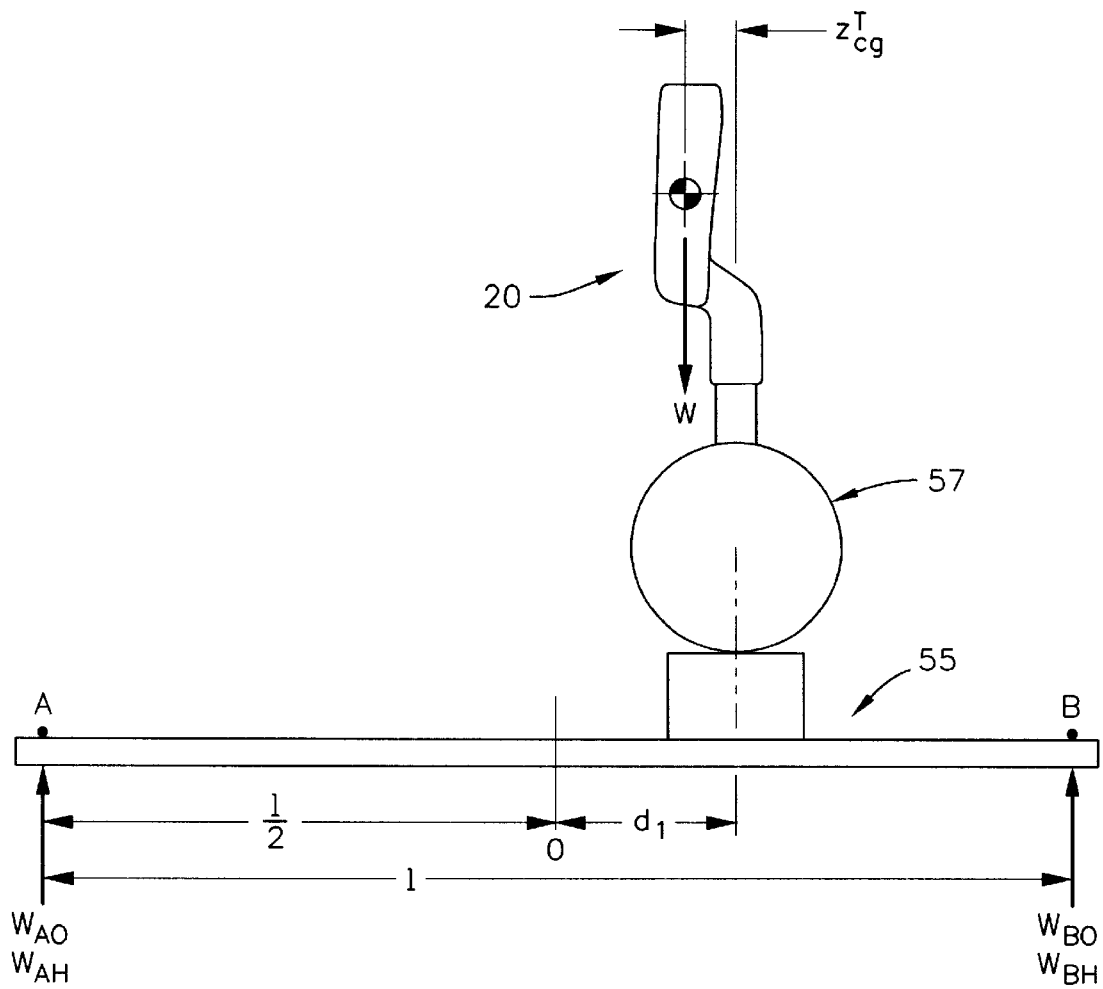
FIG. 12B is an illustration of a center of gravity table for a golf club head of the present invention used to measure the center of gravity along the Z axis.

The center of gravity and the moments of inertia of a golf club head 20 are preferably measured using a test frame ($X^T$, $Y^T$, $Z^T$), and then transformed to a head frame ($X^H$, $Y^H$, $Z^H$), as shown in FIGS. 11 and 11A. The center of gravity of a golf club head may be obtained using a center of gravity table 55 having two weight scales thereon, as shown in FIGS. 12, 12A and 12B. If a shaft is present, it is removed and replaced with a hosel cube 57 that has a multitude of faces normal to the axes of the golf club head 20. Given the weight of the golf club head 20, the scales allow one to determine the weight distribution of the golf club head when the golf club head is placed on both scales simultaneously and weighed along a particular direction, the X, Y or Z direction. The weight scales are parallel to the earth's gravity allowing the weight distribution along each direction to be calculated to determine the location of the center of gravity where:

$W_{AO}$, $W_{BO}$: Weight without head (fixture) and $W_{AH}$, $W_{BH}$: Weight with head The X axis location is determined using the following equations:

$$\Sigma M_A = 0 = (W_{BH} - W_{BO})l - rW$$

$$r = \frac{(W_{BH} - W_{BO})}{W} l$$

constraint:

$$\frac{l}{2} + d_1 = r + X_{cg}^T + s + \frac{d}{2}$$

$$-X_{cg}^T = \frac{(W_{BH} - W_{BO})}{W} l + S + \frac{d}{2} - \frac{l}{2} - d_1$$

The Y axis location is determined using the following equations:

$$\Sigma M_A = 0 = (W_{BH} - W_{BO})l - rW$$

$$r = \frac{(W_{BH} - W_{BO})}{W} l$$

Constraint $$\frac{l}{2} + d_1 = r + Y_{cg}^T$$

$$Y_{cg}^T = -\frac{(W_{BH} - W_{BO})}{w} l + \frac{l}{2} + d_1$$

The Z axis location is determined using the following equations:

$$\Sigma M_A = \bar{o} = (W_{BH} - W_{BO})l - rW$$

$$r = \frac{(W_{BH} - W_{BO})}{W} l$$

Constraint $$\frac{l}{2} + d_1 = r + Z_{cg}^T$$

$$-Z_{cg}^T = \frac{(W_{BH} - W_{BO})}{W} l - \frac{l}{2} - d_1$$

Once the test frame coordinates are determined, they are transformed to head frame coordinates using the following equations:

$$X^H{}_{cg} = -Z^T{}_{cg}$$
$$Y^H{}_{cg} = -X_{cg} \cos(\alpha_{lie}) + Y_{cg} \sin(\alpha_{lie}) - d_z/\tan(\alpha_{lie})$$
$$Z^H{}_{cg} = -X_{cg} \sin(\alpha_{lie}) + Y_{cg} \cos(\alpha_{lie}) + d_z$$

or:

$$\begin{Bmatrix} X_{cg}^H \\ Y_{cg}^H \\ Z_{cg}^H \end{Bmatrix} = \begin{pmatrix} 0 & 0 & -1 \\ -\cos(\alpha_{lie}) & \sin(\alpha_{lie}) & 0 \\ \sin(\alpha_{lie}) & \cos(\alpha_{lie}) & 0 \end{pmatrix} \begin{Bmatrix} X_{cg}^T \\ Y_{cg}^T \\ Z_{cg}^T \end{Bmatrix} + \Delta z \begin{Bmatrix} 0 \\ -1/\tan(\alpha_{lie}) \\ 1 \end{Bmatrix}$$

Figure 12C:
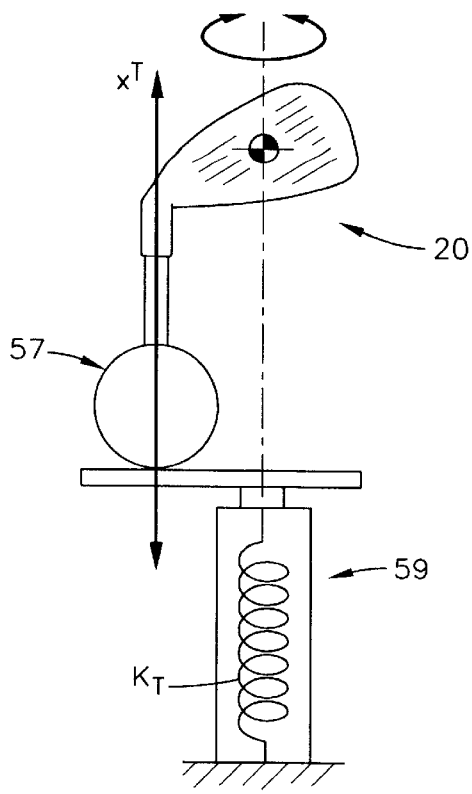
FIG. 12C is an Inertia Dynamic Moment of Inertia Machine for a golf club head of the present invention and illustrates distance from the head to spin axis in the $X^T$ direction.
Figure 12D:
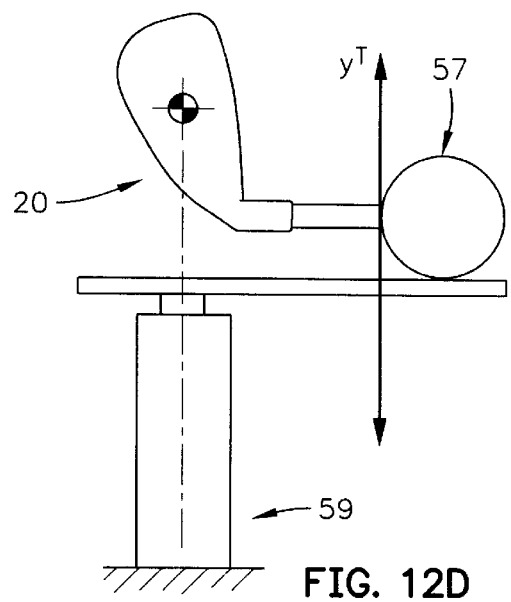
FIG. 12D is an Inertia Dynamic Moment of Inertia Machine for a golf club head of the present invention and illustrates distance from the head to the spin axis in the $Y^T$ direction.
Figure 12E:
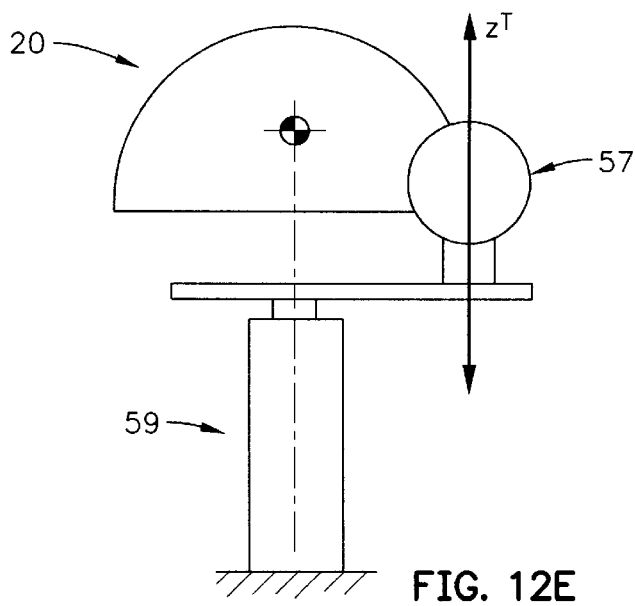
FIG. 12E is an Inertia Dynamic Moment of Inertia Machine for a golf club head of the present invention and illustrates distance from the head to the spin axis in the $Z^T$ direction.

The moment of inertia is measured using an Inertia Dynamic Moment of Inertia machine 59 as shown in FIGS. 12C, 12D and 12E. The machine 59 has a rectangular plate with adapter holes spaced 0.5 inch apart from each other. The rectangular plate is mounted on the machine 59 to allow oscillation thereof. A golf club head 20 is placed on the rectangular plate and the time for one oscillation period is measured by the machine. The oscillation time is directly related to the moment of inertia of the golf club head about the axis of rotation of the machine, which in effect is a single degree of freedom with the restoring force generated by a torsional spring.

By changing the orientation of how the golf club head is mounted on the plate, the desired moment of inertia may be measured for an axis. Nine different orientations are required to generate an inertia tensor, and since the moment of inertia measured includes the plate and the adapter, nine additional measurements are required to measure the baseline moment of inertia of the initial setup. The moment of inertia of the golf club head is the difference between the measurement taken with the golf club head, adapter and plate and the internal rotating mass of the machine, and that of the just the adapter and plate and the internal rotating mass of the machine. For the nine measurements done with the golf club head, the orientations are the same from head to head, the position on the rectangular plate depends on the center of gravity of the particular golf club head. The nine measurements without the golf club head are the same for orientation and the location of the adapter. The machine has a center of gravity and moment of inertia program to calculate the adapter holes on the rectangular plate that place the center of gravity closest to the axis of rotation, thereby minimizing error. The program uses the parallel axis theorem to account for the axis of rotation not containing the center of gravity of the golf club head. This will yield an inertia tensor about the center of gravity, which in turn allows the moment of inertia about any axis to be calculated for the golf club head.

the Z axis for the golf club head 20 of the present invention will range from 2800 g-cm$^2$ to 5000 g-cm$^2$, preferably from 3000 g-cm$^2$ to 4500 g-cm$^2$, and most preferably from 3500 g-cm$^2$ to 4000 g-cm$^2$. The moment of inertia, Iyy, about the Y axis for the golf club head 20 of the present invention will range from 1500 g-cm$^2$ to 2500 g-cm$^2$, preferably from 1800 g-cm$^2$ to 2100 g-cm$^2$, and most preferably from 1900 g-cm$^2$ to 2500 g-cm$^2$.

Figure 13:
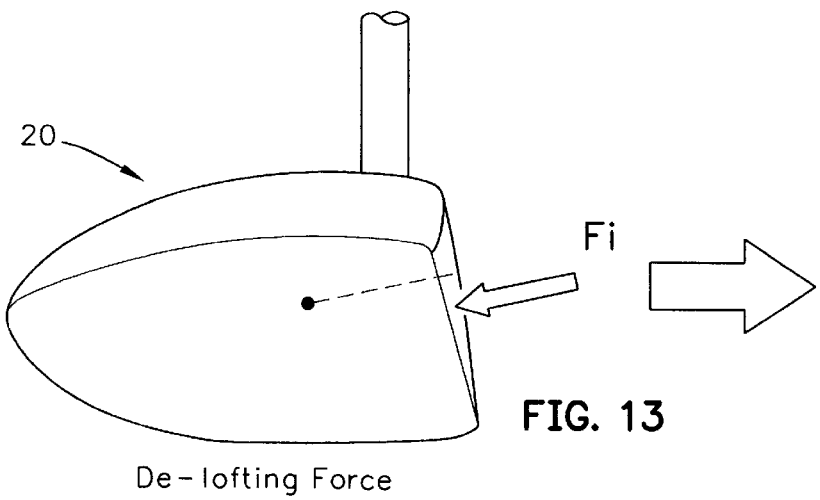
FIG. 13 is an illustration of a de-lofting force from a low-center strike of a golf ball against the striking plate a golf club of the present invention.
Figure 14:
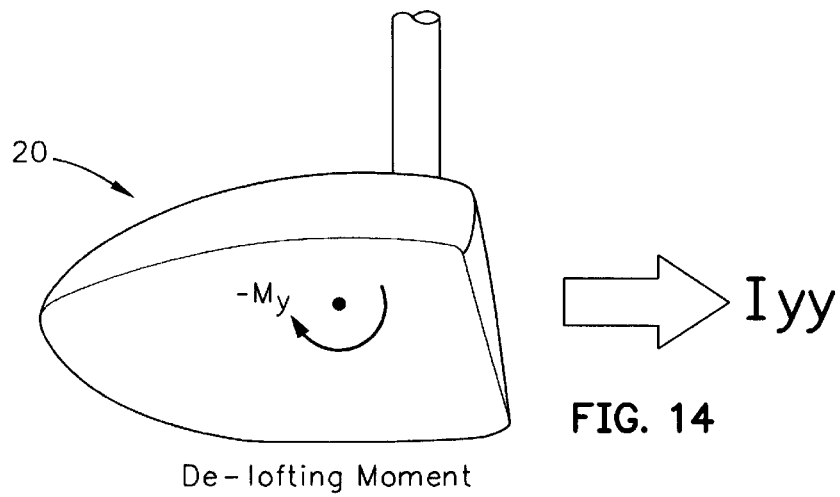
FIG. 14 is an illustration of a de-lofting moment about the Y axis through the center of gravity from a low-center strike of a golf ball against the striking plate a golf club of the present invention.
Figure 15:
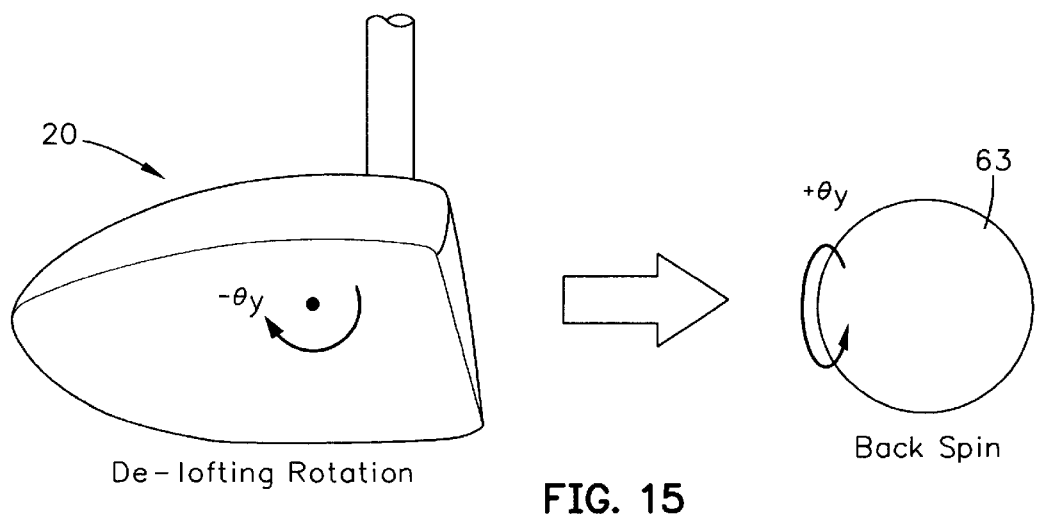
FIG. 15 is an illustration of a de-lofting rotation about the Y axis through the center of gravity from a low-center strike of a golf ball against the striking plate a golf club of the present invention, and the back spin produced on the golf ball.

FIGS. 13–18 illustrate the effects of increasing the moment of inertia, Iyy, about the Y axis for high center hits and low center hits. High center hits are defined as hits that have their impulse vector above the center of gravity of the golf club head 20, and low center hits are defined as hits that have their impulse vector below the center of gravity of the golf club head 20. For low center hits, as shown in FIGS. 13–15, the increased Iyy moment of inertia causes the golf club head 20 to rotate less in a de-lofting manner which increases the launch angle and decreases the back spin of the

TABLE ONE

| CLUB | MASS (gm) | CG (in) | | | Inertia (gm - cm$^2$) | | | | | |
| --- | --- | --- | --- | --- | --- | --- | --- | --- | --- | --- |
| | | X | Y | Z | Ixx | Iyy | Izz | Ixy | Ixz | Iyz |
| Crane Japan 1 Composite Driver | 193.9 | 0.433 | 0.944 | 0.933 | 1,700.13 | 1,044.17 | 2,150.47 | 162.12 | 3.21 | −47.49 |
| Diawa 1, G-3 Composite Driver | 186.5 | 0.707 | 0.746 | 0.87 | 1,248.07 | 1,298.21 | 1,951.54 | 89.81 | −94.18 | −1.18 |
| Pro Spirit 11° Composite Driver | 198.7 | 0.433 | 0.944 | 0.933 | 1,480.37 | 1,073.10 | 1,985.16 | 143.86 | −81.3 | 55.2 |
| Zett 10° Composite Driver | 208.8 | 0.322 | 0.547 | 1.227 | 1,989.14 | 1,166.16 | 2,155.67 | 197.83 | −62.25 | −151.52 |
| EDO 10° Composite Driver | 204.4 | 0.656 | 1.208 | 0.825 | 2,011.04 | 1,139.42 | 2,166.16 | 280.19 | −90.01 | −282.14 |
| Yonex 1 ADX 100i Composite Driver | 200 | 0.602 | 1.037 | 0.844 | 1,631.59 | 1,161.33 | 2,052.75 | 104.05 | −41.22 | 33.45 |
| Yonex 1 Aerona 300 Composite Driver | 202.9 | 0.494 | 0.624 | 0.919 | 1,876.79 | 1.155.33 | 2,435.72 | 205.06 | −92.64 | 21.86 |

Table One lists the location of the center of gravity and moment of inertia about the center of gravity for competitor composite golf club heads. The moment of inertia Izz about the Z axis is less than 2436.00 g-cm$^2$ for any of the competitor composite heads. The highest moment of inertia, Izz, about the Z axis is 2435.72 g-cm$^2$ for the Yonex 1 AERONA 300 composite driver. The moment of inertia, Iyy, about the Y axis is less than 1300.00 g-cm$^2$ for any of the competitor composite heads. The highest moment of inertia, Iyy, about the Y axis is 1298.21 g-cm$^2$ for the Daiwa 1, G 3 composite driver. The mass for all of the competitor composite heads ranges from 186 grams to 208.8 grams.

TABLE TWO

| Head | Weighting | Ixx | Iyy | Izz | Ixy | Ixz | Iyz |
| --- | --- | --- | --- | --- | --- | --- | --- |
| Pre-Ex. 1 | Shell only | 1242 | 888 | 1461 | 79 | 77 | 140 |
| Ex. 1 | Weighted | 2797 | 2183 | 3824 | 256 | 273 | 493 |
| Pre-Ex. 2 | Shell only | 1442 | 978 | 1635 | 60 | 78 | 153 |
| Ex.2 | Weighted | 2904 | 2076 | 3857 | 194 | 242 | 437 |
| Pre-Ex. 3 | Shell only | 1403 | 943 | 1602 | 63 | 72 | 165 |
| Ex. 3 | Weighted | 2716 | 2078 | 3760 | 262 | 173 | 394 |

Figure 16:
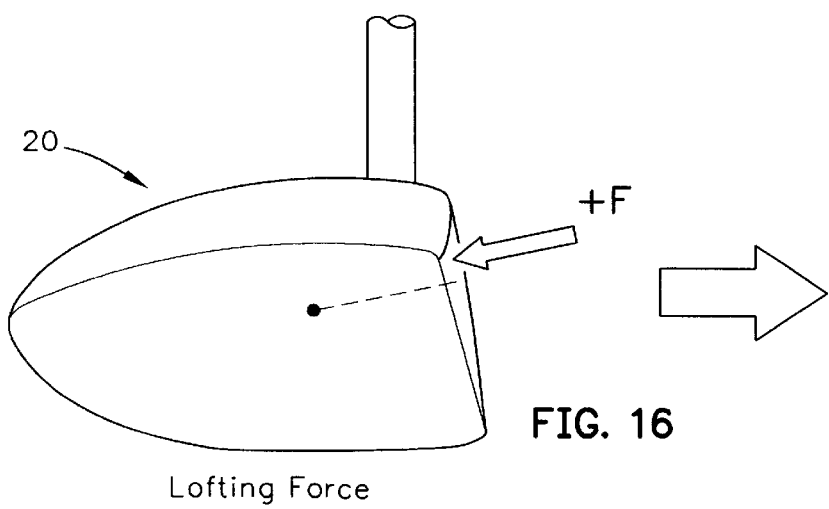
FIG. 16 is an illustration of a lofting force from a high-center strike of a golf ball against the striking plate a golf club of the present invention.
Figure 17:
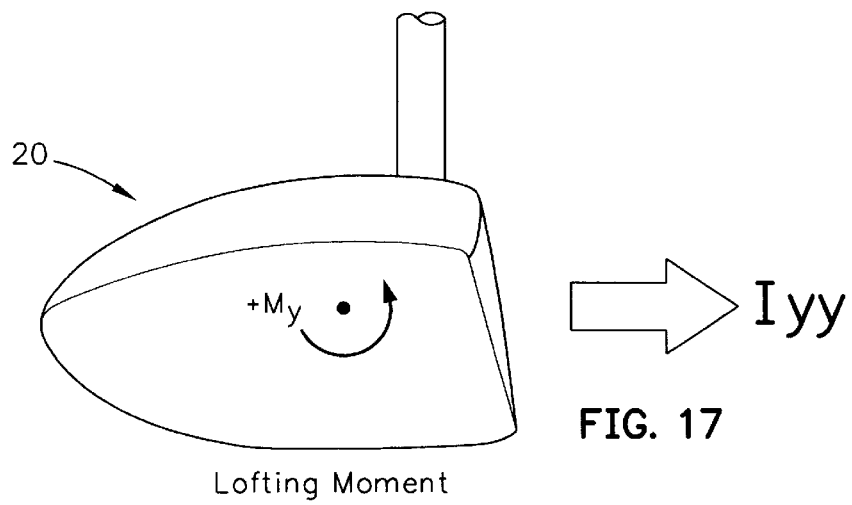
FIG. 17 is an illustration of a lofting moment about the Y axis through the center of gravity from a high-center strike of a golf ball against the striking plate a golf club of the present invention.
Figure 18:
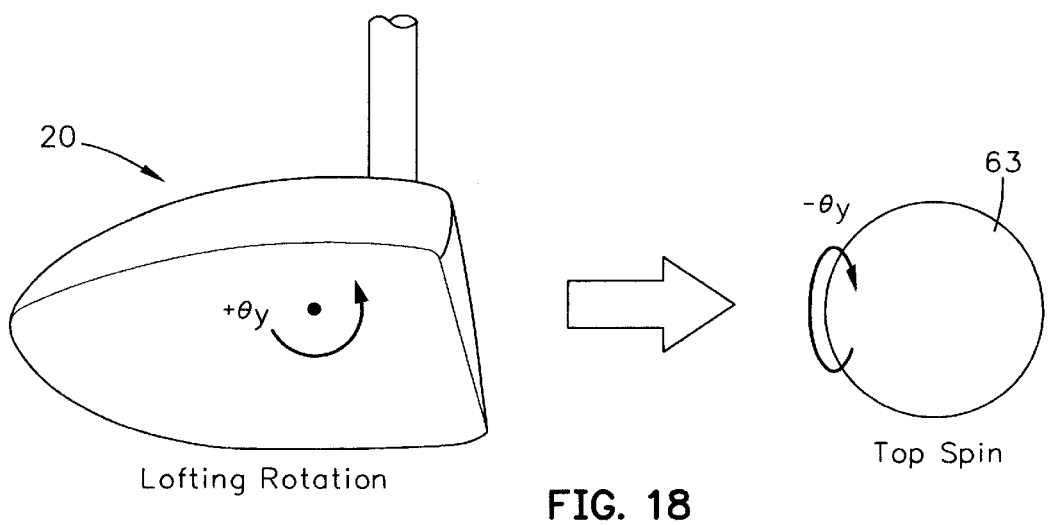
FIG. 18 is an illustration of a lofting rotation about the Y axis through the center of gravity from a high-center strike of a golf ball against the striking plate a golf club of the present invention, and the high spin produced on the golf ball.

Table Two lists the moment of inertia for golf club heads 20 of the present invention. The shell is the golf club head without the weight(s) 40. The "unweighted" club head 20 weighs from 90 grams to 120 grams thereby allowing for 60 grams to 105 grams of weight to be placed accordingly to achieve the high moment of inertia for the golf club head 20 of the present invention. The moment of inertia, Izz, about golf ball 63. For high center hits, as shown in FIGS. 16–18, the increased Iyy moment of inertia causes the golf club head 20 to rotate less in a lofting manner which increases the launch angle and reduces the back spin of the golf ball 63. Consequently, the overall average distance for a 100 MPH swing speed will increase as the moment of inertia, Izz, increases for a golf club head.

Figure 19:
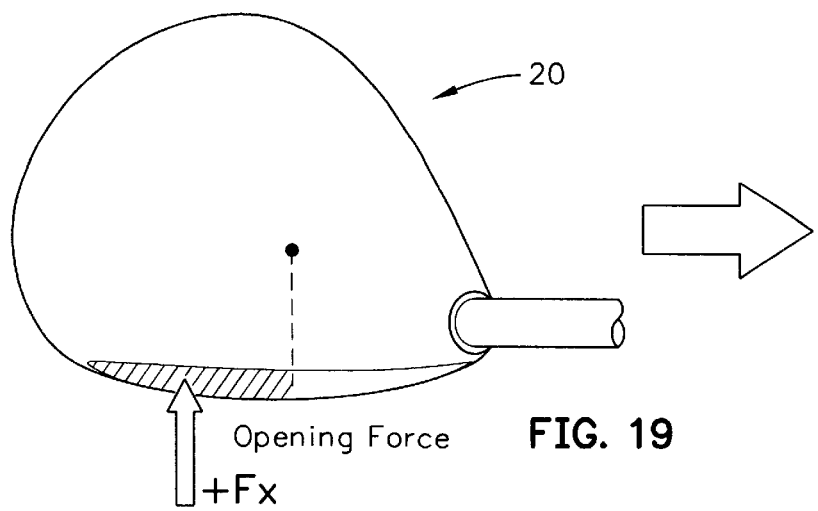
FIG. 19 is an illustration of an opening force from center-toe strike of a golf ball against the striking plate a golf club of the present invention.
Figure 20:
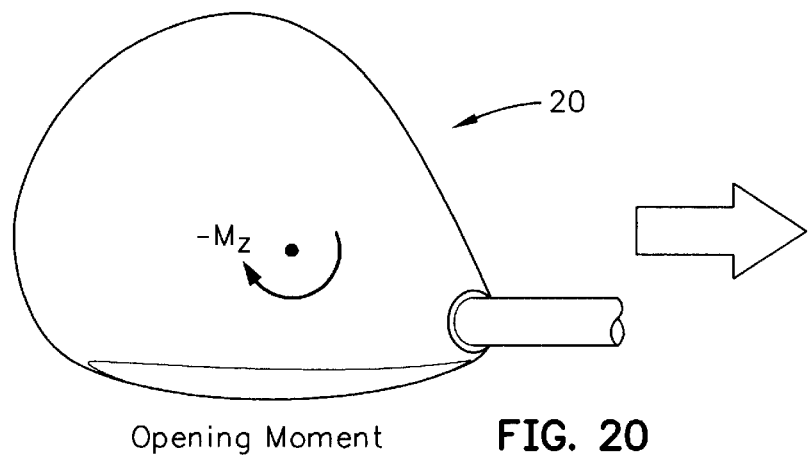
FIG. 20 is an illustration of an opening moment about the Z axis through the center of gravity from a center-toe strike of a golf ball against the striking plate a golf club of the present invention.
Figure 21:
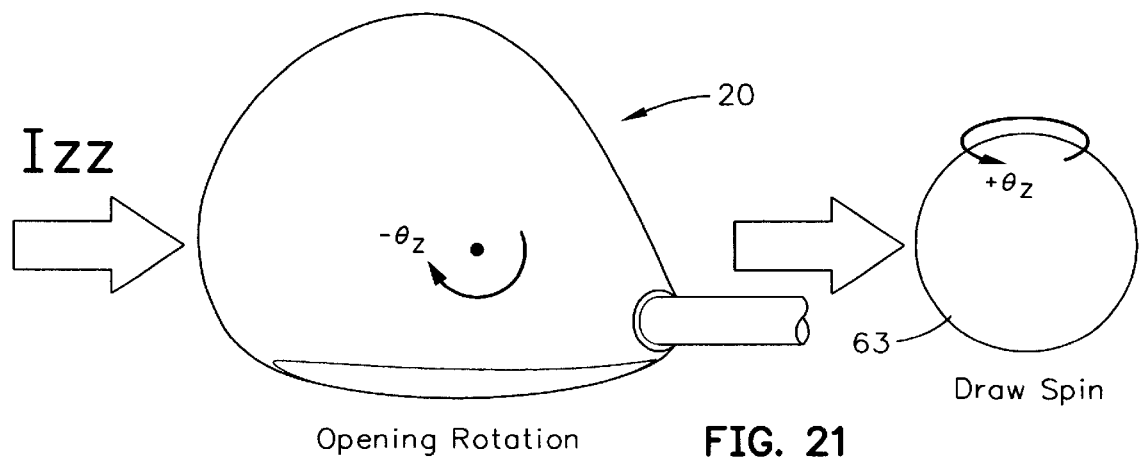
FIG. 21 is an illustration of an opening rotation about the Z axis through the center of gravity from a low-center strike of a golf ball against the striking plate a golf club of the present invention, and the draw spin produced on the golf ball.

FIGS. 19–24 illustrate the effects of increasing the moment of inertia Izz about the Z axis for toe-ward or heel-ward hits. A toe-ward hit is defined as a hit that is off-center from the center of gravity toward the toe. A heel ward hit is defined as a hit that is off-center from the center of gravity toward the heel. For toe ward hits, as shown in FIGS. 19–21, the increased moment of inertia Izz causes the golf club head 20 to rotate less in an opening manner which decreases the side angle to the right and decreases the draw spin of the golf ball 63. For heel ward hits, as shown in FIGS. 22–24, the increased moment of inertia, Izz, causes the golf club head 20 to rotate less in a closing manner which decreases the side angle to the left and decreases the fade spin of the golf ball 63. The overall average distance for a 100 MPH swing speed will increase as the moment of inertia, Izz, increases for a golf club head.

Figure 25:
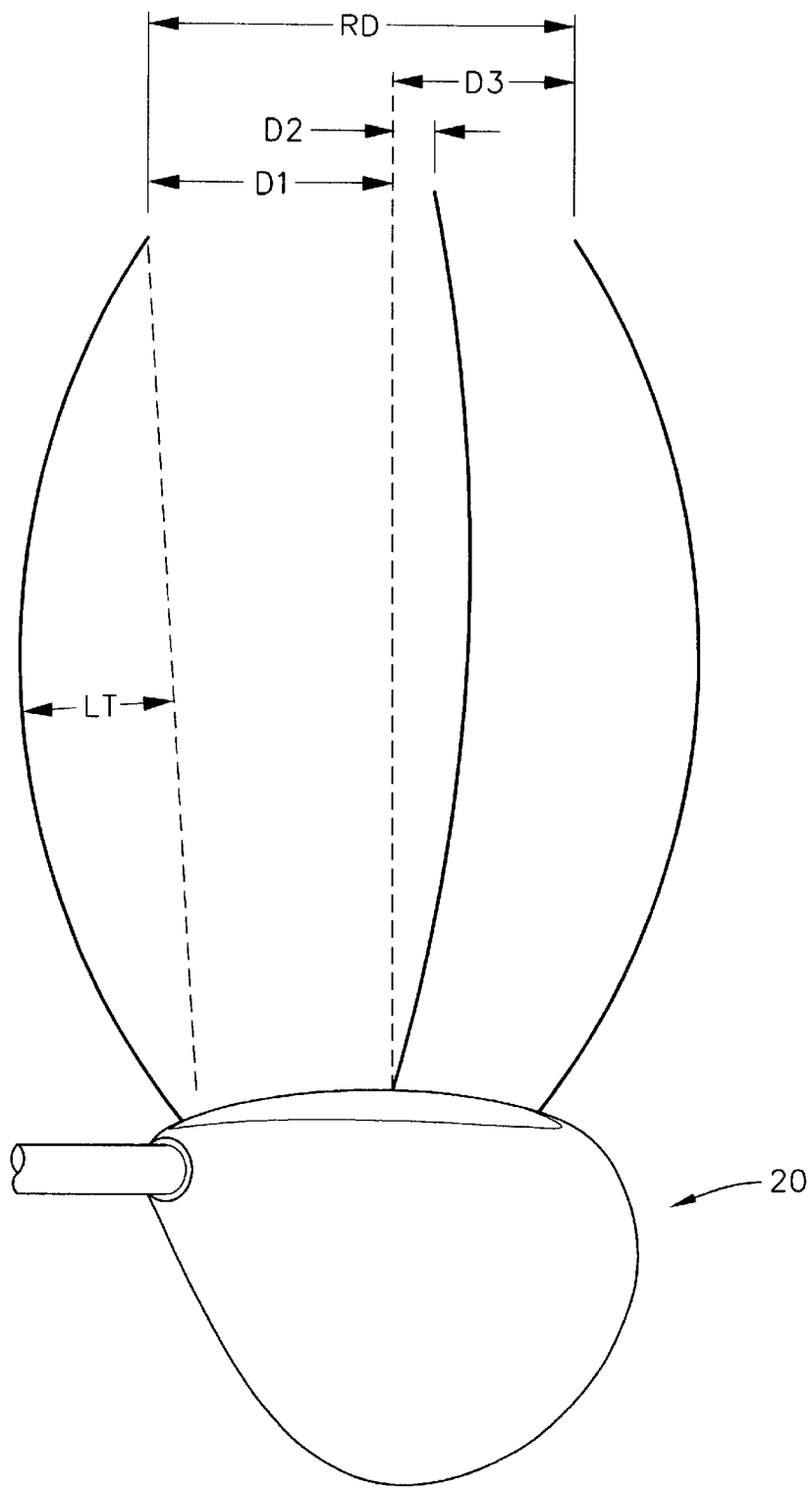
FIG. 25 is an illustration of some possible dispersions of golf balls hit by a golf club of the present invention.

As shown in FIG. 25, the increased moment of inertia, Izz, about the Z axis will result in a preferred ball flight. Increasing the moment of inertia, Izz, about the Z axis does not necessarily improve the relative dispersion pattern, "RD", of multiple hits at various locations on the striking plate of the golf club head 20. However, toe ward and heel ward hits have a reduced lateral apex for multiple hits. Overall dispersion of multiple hits is a function of several parameters such as center of gravity, bulge radius and the coefficient of restitution of the golf club head for a given head speed. Dispersion is not necessarily improved or worsened as Izz changes, provided the bulge radius is adjusted appropriately.

Figure 26:
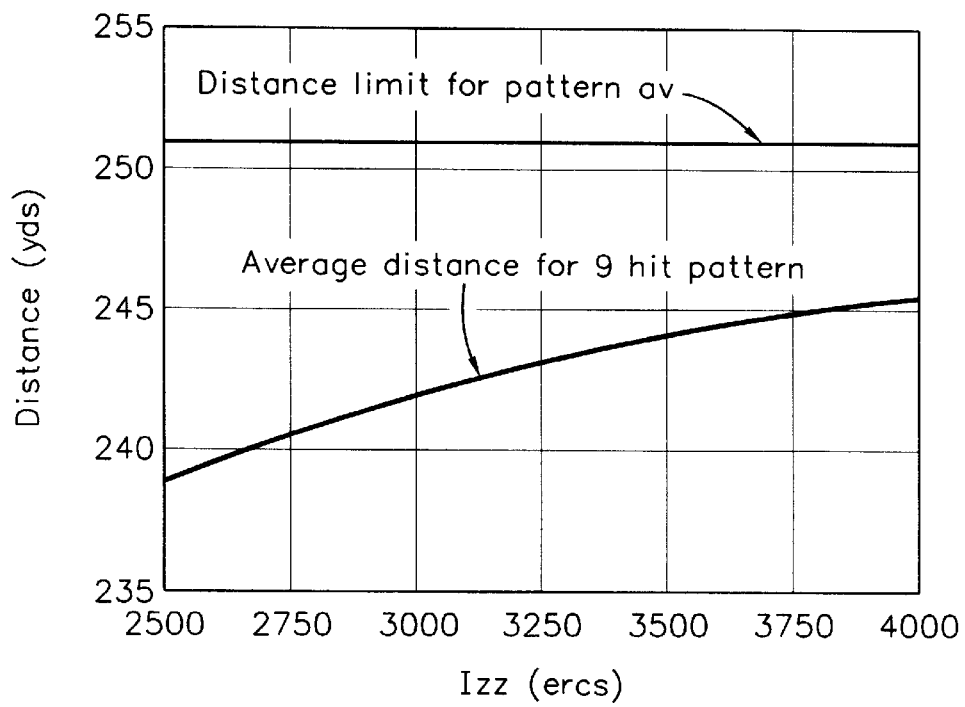
FIG. 26 is a graph of distance versus increased moment of inertia, Izz.

FIG. 26 is a graph showing that the overall average distance (nine hit positions) for a 100 MPH swing speed will increase as the moment of inertia, Izz, increases for a golf club head.

Figure 27:
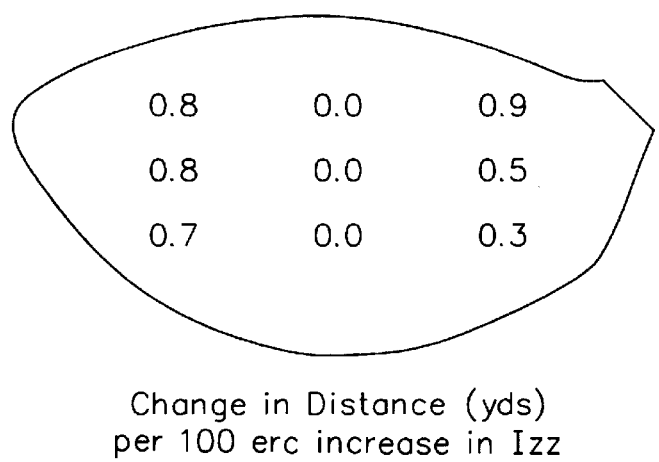
FIG. 27 is a schematic drawing of a face of a golf club head with the change in distance at nine different hit locations per 100 g-cm² increase in the moment of inertia, Izz.

FIG. 27 illustrates the increase in distance at each of the nine hit positions of a face per 100 g-cm$^2$ increase in the moment of inertia, Izz, for a golf club head.

Figure 28:
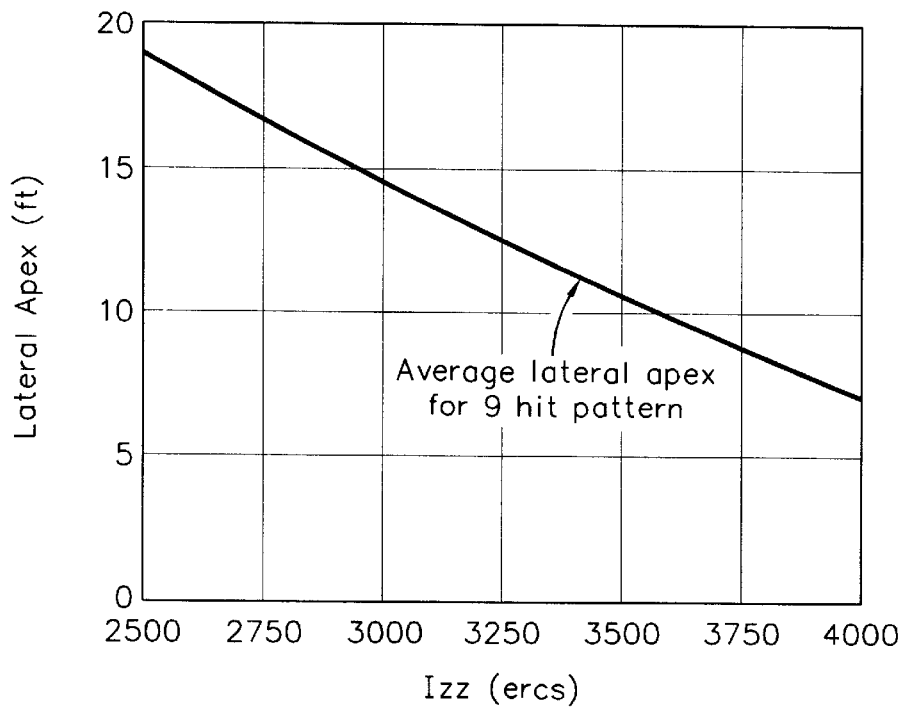
FIG. 28 is a graph of lateral apex versus increased moment of inertia, Izz.

FIG. 28 is a graph showing that the average lateral apex (nine hit positions) for a 100 MPH swing speed will decrease as the moment of inertia, Izz, increases for a golf club head. The lateral apex is the bend of the shot in flight from the impact position to the final flight position (not the final roll position).

Figure 29:
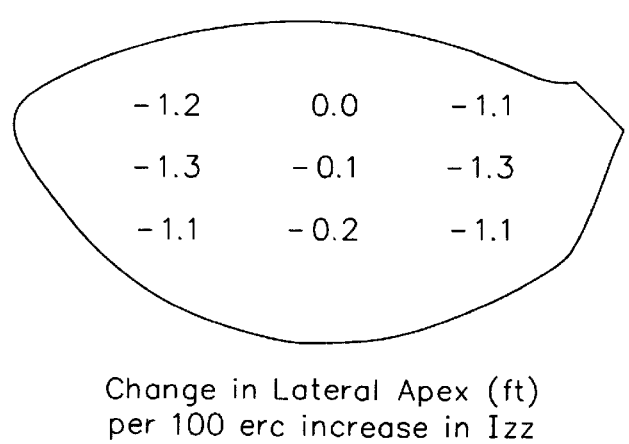
FIG. 29 is a schematic drawing of a face of a golf club head with the change in lateral apex at nine different hit locations per 100 g-cm2 increase in the moment of inertia, Izz.

FIG. 29 illustrates the decrease in the lateral apex at each of the nine hit positions of a face per 100 g-cm$^2$ increase in the moment of inertia, Izz, for a golf club head.

Figure 30:
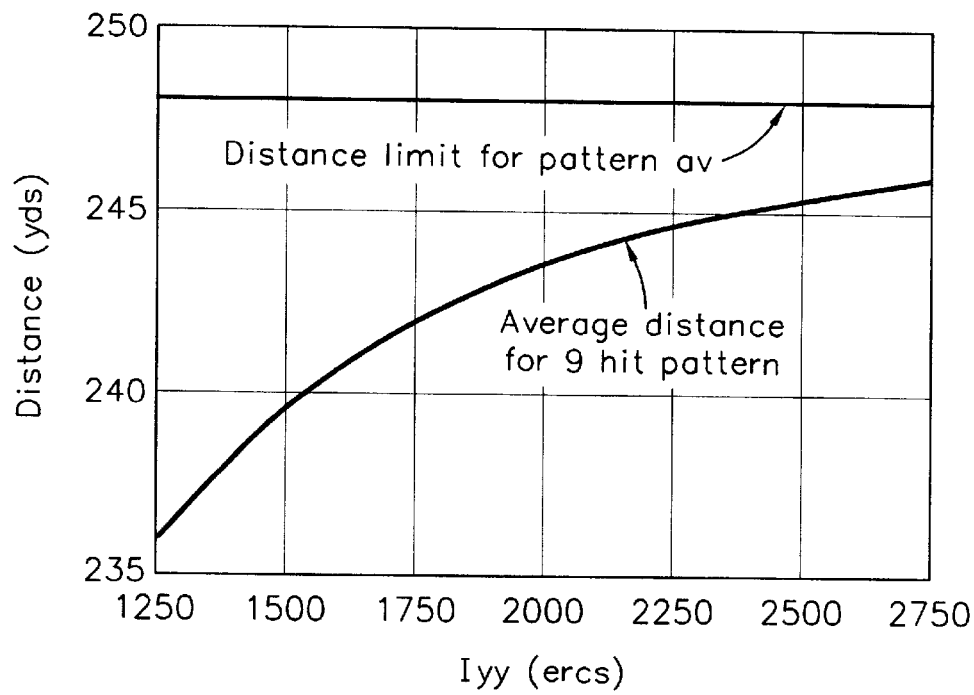
FIG. 30 is a graph of distance versus increased moment of inertia, Iyy.

FIG. 30 is a graph showing that the overall average distance (nine hit positions) for a 100 MPH swing speed will increase as the moment of inertia, Iyy, increases for a golf club head.

Figure 31:
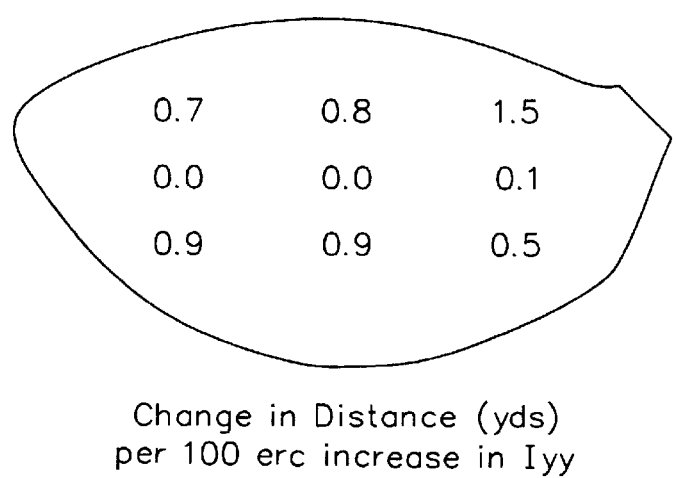
FIG. 31 is a schematic drawing of a face of a golf club head with the change in distance at nine different hit locations per 100 g-cm2 increase in the moment of inertia, Iyy.

FIG. 31 illustrates the increase in distance at each of the nine hit positions of a face per 100 g-cm$^2$ increase in the moment of inertia, Iyy, for a golf club head.

Figure 32:
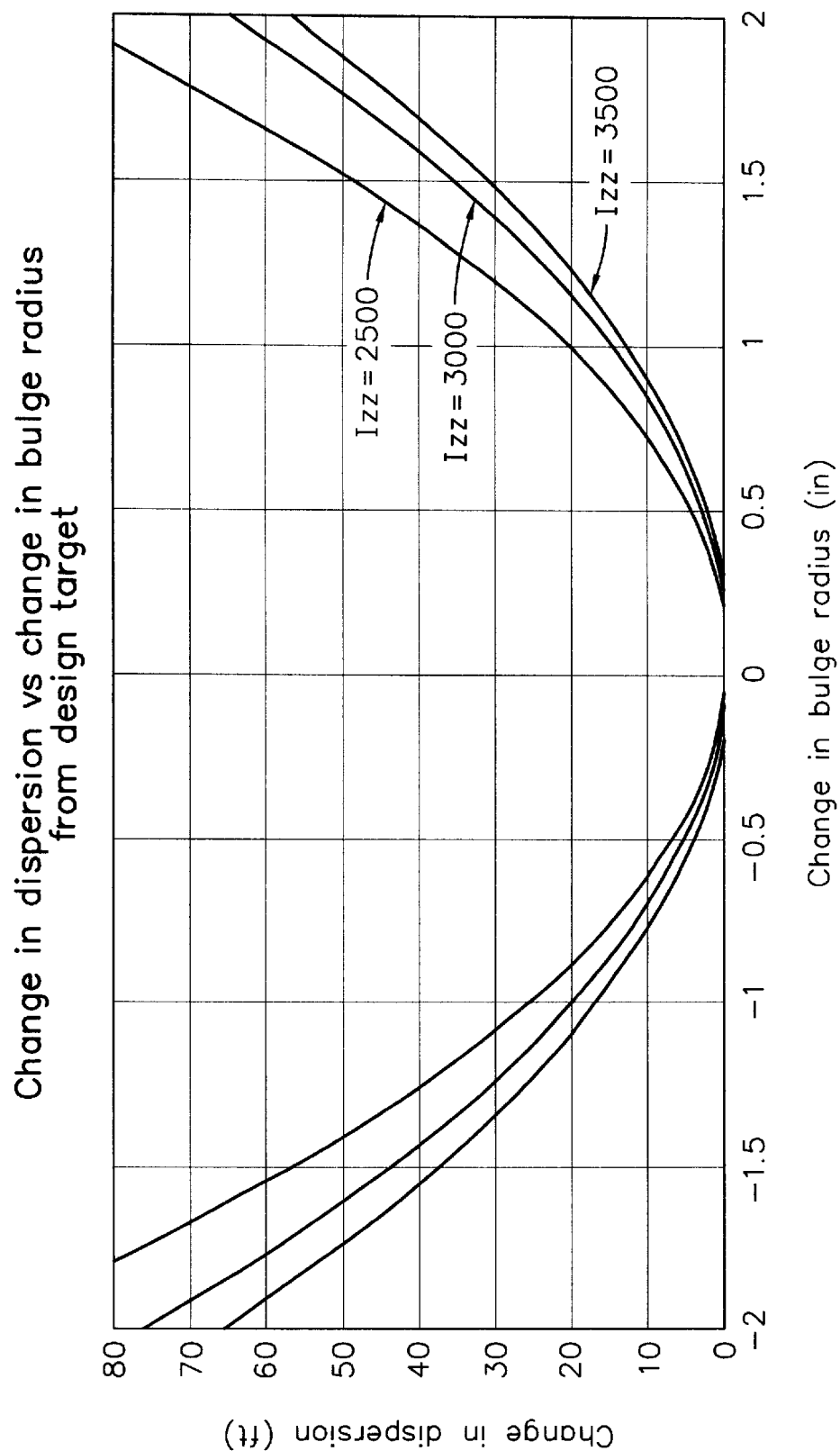
FIG. 32 is a graph of change in dispersion versus change in bulge radius for various club heads with varying moments of inertia, Izz.

FIG. 32 is a graph of the change in dispersion versus the change in bulge radius of a face for club heads with varying moments of inertia, Izz. As shown in FIG. 32, the change in dispersion is reduced as the moment of inertia, Izz, is increased for a golf club head.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A golf club head comprising:

a body having a hollow interior and composed of a composite material, the body having a face, a sole, a crown, a ribbon juxtaposed by the sole and the crown, a heel end and a toe end; and a plurality of weight strips, each of the plurality of weight strips composed of a material having a density greater than the composite material, each of the plurality of weight strips disposed in the ribbon;

wherein the body has a volume greater than 300 cm$^3$ and has a moment of inertia, Izz, about a vertical axis Z through the center of gravity of the golf club head that ranges from 3000 g-cm$^2$ to 5000 g-cm$^2$, and a moment of inertia, Iyy, about the horizontal axis Y through the center of gravity of the golf club head that ranges from 1900 g-cm$^2$ to 2500 g-cm$^2$.

2. The golf club head according to claim 1 wherein each of the plurality of weight strips is composed of a copper material.

3. The golf club head according to claim 1 wherein each of the plurality of weight strips is parallel to each other on the ribbon.

4. The golf club head according to claim 1 wherein the plurality of weight strips comprise a first weight strip disposed in the heel end of the ribbon, a second weight strip disposed in the rear of the ribbon and a third weight strip disposed in the toe end of the ribbon.

5. The golf club head according to claim 1 wherein the body is composed of a plurality of layers of plies of pre-peg material.

6. The golf club head according to claim 1 wherein the golf club head weighs between 170 grams to 250 grams.

* * * * *